US011956596B2

(12) United States Patent
Johansen

(10) Patent No.: US 11,956,596 B2
(45) Date of Patent: Apr. 9, 2024

(54) EARPIECE FOR A HEARING DEVICE, DOME AND EARPIECE PART

(71) Applicant: GN Hearing A/S, Ballerup (DK)

(72) Inventor: Jan Johansen, Ballerup (DK)

(73) Assignee: GN HEARING A/S, Ballerup (DK)

( * ) Notice: Subject to any disclaimer, the term of this patent is extended or adjusted under 35 U.S.C. 154(b) by 0 days.

(21) Appl. No.: 17/523,547

(22) Filed: Nov. 10, 2021

(65) Prior Publication Data

US 2022/0174431 A1 Jun. 2, 2022

(30) Foreign Application Priority Data

Nov. 30, 2020 (DK) ............................ PA202070805

(51) Int. Cl.
*H04R 25/00* (2006.01)

(52) U.S. Cl.
CPC ............. *H04R 25/48* (2013.01); *H04R 25/60* (2013.01); *H04R 25/652* (2013.01)

(58) Field of Classification Search
CPC .... H04R 2460/17; H04R 25/48; H04R 25/60; H04R 25/652
USPC .......................................................... 381/325
See application file for complete search history.

(56) References Cited

U.S. PATENT DOCUMENTS 7,551,747 B2 * 6/2009 Huynh ................. H04R 25/654 381/328
2010/0322452 A1 * 12/2010 Ladabaum ........... H04R 25/656 381/375
2013/0051592 A1 2/2013 Campbell et al.
2013/0148830 A1 6/2013 Sakaguchi et al.
2015/0078601 A1 * 3/2015 Petersen ................ H04R 25/60 381/325
2020/0196074 A1 * 6/2020 Tiefenau .............. H04R 25/456
2022/0070573 A1 * 3/2022 Møller ................. H04R 25/654
(Continued)

FOREIGN PATENT DOCUMENTS

EP 2819435 A1 12/2014
EP 3675524 A1 7/2020
EP 3706440 A1 9/2020
(Continued)

OTHER PUBLICATIONS

Foreign Exam Report for Danish Patent Appln. No. PA 2020 70805 dated Feb. 26, 2021.

*Primary Examiner* — Suhan Ni
(74) *Attorney, Agent, or Firm* — Vista IP Law Group, LLP

(57) ABSTRACT

An earpiece for insertion into an ear canal of a user and having a longitudinal axis is disclosed. The earpiece comprises an earpiece part comprising an earpiece housing having a distal end, a proximal end, and an outer surface connecting the distal end to the proximal end. The earpiece housing comprises a first primary vent aperture and a second primary vent aperture in the outer surface. The earpiece part optionally comprises a receiver arranged within the earpiece housing. The earpiece comprises a dome for securing the earpiece in the ear canal. The dome has an inner surface extending circumferentially along the outer surface of the earpiece housing. The dome comprises a proximal surface having a first primary vent aperture. The earpiece comprises a vent path forming a fluid communication between the first primary vent aperture of the dome and the second primary vent aperture of the earpiece housing.

29 Claims, 9 Drawing Sheets

(56) References Cited

U.S. PATENT DOCUMENTS

| | | | | |
|---|---|---|---|---|
| 2022/0174435 | A1 * | 6/2022 | Mehr | H04R 25/554 |

FOREIGN PATENT DOCUMENTS

| | | | |
|---|---|---|---|
| EP | 3726855 | A1 | 10/2020 |
| EP | 3726855 | B1 | 9/2021 |
| EP | 3716649 | B1 | 12/2022 |
| WO | WO 2019/052715 | A1 | 3/2019 |

* cited by examiner

EARPIECE FOR A HEARING DEVICE, DOME AND EARPIECE PART

RELATED APPLICATION DATA

This application claims priority to, and the benefit of, Danish Patent Application No. PA 2020 70805 filed on Nov. 30, 2020. The entire disclosure of the above application is expressly incorporated by reference herein.

FIELD

The present disclosure relates to an earpiece for a hearing device, a dome for an earpiece of a hearing device and an earpiece part.

BACKGROUND

Earpieces are used in a large variety of situations, where an audio signal is presented to the user via the earpiece. Further, earpieces are used in communication systems for presenting to and/or receiving audio signals from the user.

In two-part hearing devices with an earpiece and an external device, the earpiece is connected to the external device by a cable comprising one or more wires and/or a sound guiding channel.

Earpieces for hearing devices are typically worn for many hours and therefore wearing comfort is of key importance for a hearing device user, especially with the varying ear canal sizes of different users. Venting of the ear canal when the earpiece is arranged in the ear canal has proven to be a desired feature e.g., to avoid or reduce occlusion effects. On the other hand, a closed or sealed ear canal may be desired in different user situations.

SUMMARY

Accordingly, there is a need for hearing devices and methods with improved with improved fit and sound quality.

An earpiece for a hearing device for insertion into an ear canal of a user and having a longitudinal axis is disclosed. The earpiece comprises an earpiece part comprising an earpiece housing having a distal end, a proximal end, and an outer surface connecting the distal end to the proximal end. The earpiece housing comprises a first primary vent aperture and/or a second primary vent aperture in the outer surface. The earpiece part optionally comprises a receiver arranged within the earpiece housing. The earpiece comprises a dome for securing the earpiece in the ear canal. The dome has an inner surface extending circumferentially along the outer surface of the earpiece housing. The dome comprises a proximal surface optionally having a first primary vent aperture. The earpiece comprises a vent path optionally forming a fluid communication between the first primary vent aperture of the dome and the second primary vent aperture of the earpiece housing via the first primary vent aperture of the earpiece housing.

It is an important advantage of the hearing device that a size of the earpiece can be reduced thereby increasing the wearing comfort to a user. By placing the vent apertures, such as the first primary vent aperture and the second primary vent aperture in the outer surface of the earpiece housing, the dimensions of the proximal end of the earpiece housing, such as of a sound outlet from the earpiece housing may be reduced. This can allow for ease of fit with a user. Further, reducing the size of the proximal end of the earpiece housing facilitates insertion and withdrawal of the earpiece from an ear of the user. Furthermore, the risk of the earpiece and/or parts of the earpiece getting stuck inside the ear is reduced. This also allows for an improved form factor of the earpiece and/or the dome which can increase the wearing comfort to a user of the earpiece.

Previous hearing device solutions typically provide venting through the sound outlet on the proximal end of an earpiece housing. In order to provide sufficient venting, the proximal end of the earpiece housing may be of a relatively large size and may thus not fit properly in small ear canals. Since the proximal end of the earpiece housing, such as the sound outlet, is not required to accommodate vent apertures in the disclosed earpiece, the size of the proximal end of the earpiece housing can be reduced. The disclosed earpiece may thus be more accommodating and easier to insert and withdraw to those users with smaller ear canals.

The earpiece of the present disclosure further reduces the risk of vent channels and/or vent mechanisms of the earpiece clogging up. This may e.g., be caused by cerumen entering the earpiece housing through the vent apertures in the earpiece housing. By providing vent apertures in the dome for connecting the vent apertures in the earpiece housing with the ear canal of the user, cerumen entering the vent apertures from the ear canal will enter the vent apertures in the dome from where it is easily removable, e.g., by removing the dome from the earpiece housing and cleaning or replacing the dome. Thus, by providing vent apertures in the dome, the risk of the vent apertures in the earpiece housing getting clogged is reduced, which reduces the risk of the vent mechanism getting clogged, which may otherwise lead to reduced functionality or a malfunction of the earpiece.

Thus, the earpiece of the present disclosure allows for improved sizing, improved comfort to a user, and improved sound quality.

Further, an earpiece part for an earpiece of a hearing device is provided. The earpiece part comprises an earpiece housing having a distal end, a proximal end, and an outer surface connecting the distal end to the proximal end. The earpiece housing comprises a first primary vent aperture and/or a second primary vent aperture in the outer surface. The first primary vent aperture of the earpiece housing may be proximal to the second primary vent aperture of the earpiece housing.

By placing the vent apertures, such as the first primary vent aperture in the outer surface of the earpiece housing, the dimensions of the proximal end of the earpiece housing, such as of a sound outlet of the earpiece housing, can be reduced. This can allow for ease of fit of the earpiece with a user. Further, reducing the size of the proximal end of the earpiece housing facilitates insertion and withdrawal of the earpiece from an ear of the user, e.g., by provision of an improved attachment of the dome to the earpiece housing. Furthermore, the risk of the earpiece and/or parts of the earpiece getting stuck inside the ear is reduced. Reducing, the size of the proximal end of the earpiece housing also allows for an improved form factor of the earpiece and/or the dome which can increase the wearing comfort to a user of the earpiece.

Further, a dome for an earpiece of a hearing device is provided. The dome is configured for securing the earpiece in an ear canal. The dome has an inner surface forming a cavity and configured for extending circumferentially along an outer surface of an earpiece housing. The dome comprises a proximal surface having a first primary vent aperture. The first primary vent aperture is optionally in fluid communication with the cavity.

Providing the dome for the earpiece with a first primary vent aperture being in communication with the cavity formed by the inner surface, enables the first primary vent aperture of the earpiece housing to be arranged in the outer surface of the earpiece housing while being in fluid communication with a proximal side of the earpiece. Thus, the dome according to the current disclosure enables a size reduction of the proximal end of the earpiece housing, thereby enabling an improved form factor of the earpiece which can increase the wearing comfort to a user of the earpiece. The dome of the present disclosure further reduces the risk of vent channels and/or vent mechanisms of the earpiece clogging up. By providing the first primary vent aperture in the dome, cerumen entering the vent apertures from the ear canal will enter the vent apertures in the dome, instead of vent apertures in the earpiece housing, from where it can easily be removed. Thus, by providing vent apertures in the dome, the risk of the vent apertures in the earpiece housing getting clogged is reduced, which reduces the risk of the vent mechanism getting clogged, which may otherwise lead to reduced functionality or a malfunction of the earpiece.

Also, a hearing device comprising an earpiece as described herein is provided

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
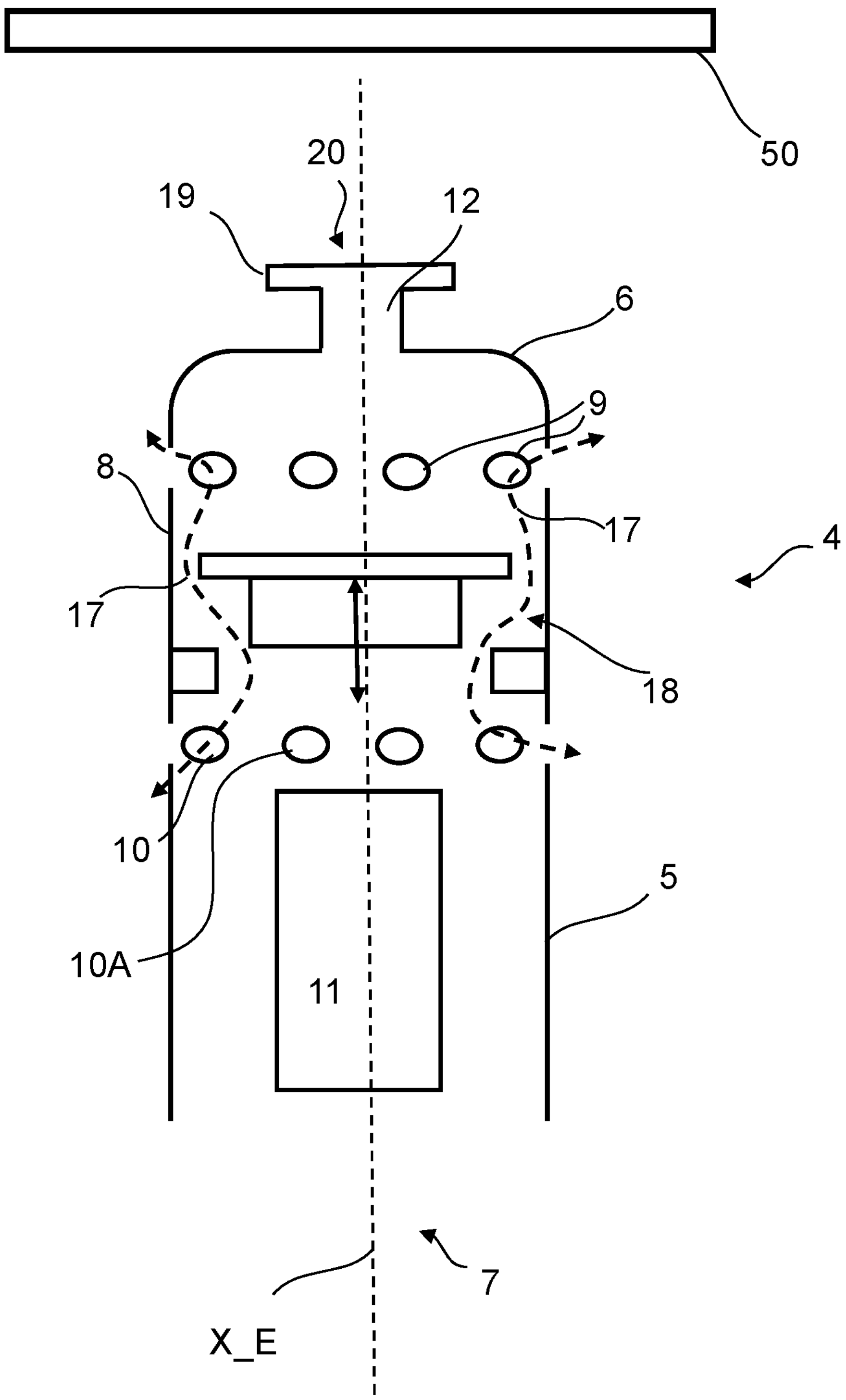
FIG. 1 schematically illustrates an exemplary earpiece part for an earpiece of a hearing device, FIG. 2 schematically illustrates an exemplary dome for an earpiece of a hearing device, FIG. 3 schematically illustrates a proximal view of an exemplary dome for an earpiece of a hearing device, FIG. 4 schematically illustrates a distal view of an exemplary dome for an earpiece of a hearing device, FIG. 5 schematically illustrates an exemplary earpiece of a hearing device.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

An earpiece for a hearing device is disclosed. The hearing device may be configured to be worn at an ear of a user and may be a hearable or a hearing aid, wherein the processor is configured to compensate for a hearing loss of a user. The hearing device may be of the behind-the-ear (BTE) type, in-the-ear (ITE) type, in-the-canal (ITC) type, receiver-in-canal (RIC) type, receiver-in-the-ear (RITE) type, and/or microphone-and-receiver-in-ear (MaRie) type.

The earpiece is configured for insertion into an ear canal of a user and has a longitudinal axis. The earpiece comprises an earpiece part comprising an earpiece housing having a distal end, a proximal end, and an outer surface connecting the distal end to the proximal end. The proximal end can herein be seen as the end closest to an ear drum of the user when the earpiece is inserted into the ear of the user. The distal end can herein be seen as the end furthest away from an ear drum of the user when the earpiece is inserted into the ear of the user.

The earpiece housing comprises a first primary vent aperture and/or a second primary vent aperture in the outer surface, such as in the outer surface of the earpiece housing. The first primary vent aperture and the second primary vent aperture allow air to flow through the outer surface of the earpiece housing, such that air can enter or leave the earpiece housing through the first primary vent aperture and the second primary vent aperture.

The earpiece part comprises a receiver arranged within the earpiece housing. The receiver is configured for providing an audio output signal to an ear canal when the earpiece is inserted into the ear canal. The receiver has a receiver axis. The receiver axis may be a longitudinal center axis of the receiver. The receiver may comprise a receiver membrane. The receiver axis may be perpendicular to a normal of the receiver membrane.

The earpiece comprises a dome for securing the earpiece in the ear canal. The dome has an inner surface extending circumferentially along the outer surface of the earpiece housing. The dome comprises a proximal surface optionally having a first primary vent aperture. The proximal surface of the dome is a surface of the dome facing the ear drum when the earpiece is inserted into the ear canal of the user. The earpiece comprises a vent path forming a fluid communication between the first primary vent aperture of the dome and the second primary vent aperture of the earpiece housing via the first primary vent aperture of the earpiece housing and/or between the second primary vent aperture of the dome and the second primary vent aperture of the earpiece housing.

The vent path allows air to flow through at least a part of the earpiece housing, such as from a proximal end of the earpiece housing to a distal end of the earpiece housing and/or from the distal end of the earpiece housing to the proximal end of the earpiece housing. By routing the vent path through the dome, such that the vent apertures in the dome constitute the outer part of the vent path being in contact with the ear canal, the vent apertures and/or the vent mechanism arranged in the earpiece housing clogging up is prevented, since any cerumen entering the vent path from the ear canal will be caught in the dome of the earpiece. The dome of the earpiece can be easily be removed from the earpiece housing and may be cleaned or replaced. Thereby a degradation of the sound quality and subsequently a malfunction of the hearing device may be prevented. In one or more example earpieces, the dome may comprise additional vent apertures, such as first and second tertiary vent apertures, first and second quaternary vent apertures, etc. The first tertiary vent apertures, the first quaternary vent apertures and/or any further first vent apertures may be in fluid communication with the first vent groove. The first tertiary vent apertures, the first quaternary vent apertures and/or any further first vent apertures may be arranged on the proximal surface of the dome. The second tertiary vent apertures, the second quaternary vent apertures and/or any further second vent apertures may be in fluid communication with the second vent groove. The second tertiary vent apertures, the second quaternary vent apertures and/or any further second vent apertures may be arranged on the distal surface of the dome. The vent apertures may be evenly distributed around the proximal surface and/or the distal surface of the dome. The angular distance between the first vent apertures arranged on the proximal surface of the dome may be 360/M degrees, where M is the number of first vent apertures arranged on the proximal surface of the dome. The angular distance between the second vent apertures arranged on the distal surface of the dome may be 360/N degrees, where N is the number of second vent apertures arranged on the distal surface of the dome. In one or more example domes, N and M are equal. In one or more example domes, N and M are different.

The earpiece housing may have a sound outlet at the proximal end of the earpiece housing. The proximal end of the earpiece comprising the sound outlet may herein also be referred to a nozzle or a nozzle element. The nozzle element may have a cylindrical shape. The sound outlet may be an aperture in the earpiece housing, e.g. in proximal end surface of the earpiece housing. The sound outlet may be separate from the first vent aperture(s), such as first primary vent aperture and/or first secondary vent aperture, of the earpiece housing. The sound outlet may have an outlet area, the outlet area having a normal. The normal of the outlet area of the sound outlet may in one or more exemplary earpieces be arranged parallel to a longitudinal axis of the earpiece and/or of the earpiece housing. The outlet area may in one or more example earpieces correspond to a base area of the nozzle element. In one or more exemplary earpieces, the normal of the outlet area of the sound outlet may be arranged at an angle larger than 0 to the longitudinal axis of the earpiece and/or of the earpiece housing. Previously, earpiece housings were typically vented through the sound outlet of the earpiece housing, such that the sound outlet constituted and/or comprised the first primary vent aperture of the earpiece housing. However, having the first primary vent aperture in the sound outlet may require that the sound outlet is of a size allowing for both sound to be emitted and air to flow into the earpiece housing via the sound outlet. Increasing the size of the sound outlet of the housing brings with it an increase of the outer dimensions of the earpiece housing, which may cause discomfort for a user of the earpiece. By arranging the primary vent apertures, such as the first primary vent aperture and the second primary vent aperture, in the outer surface of the earpiece housing as disclosed herein, in other words separate from the sound outlet, the size of the proximal end of the earpiece housing, such as of the nozzle element, may be reduced. The sound outlet and/or the proximal part of the earpiece housing may in one or more example earpieces be configured to hold a filter device for preventing cerumen from entering the sound outlet. Thereby, the sound outlet may be prevented from clogging up, which could otherwise cause a degradation of the sound quality and subsequently a malfunction of the hearing device.

In one or more example earpieces, the inner surface of the dome comprises a first vent groove configured to be or being in fluid communication with the first primary vent aperture in the dome. The first vent groove may be aligned with the first primary vent aperture in the earpiece housing along the longitudinal axis, such as the longitudinal axis of the earpiece housing. The first vent groove may be circumferentially arranged along the inner surface of the dome. The first vent groove may have a first depth, e.g., in the range from 0.2 mm to 2 mm. The first vent groove may extend fully or partly along the circumference of the inner surface. The first vent groove may extend perpendicular to the longitudinal axis. By providing the inner surface of the dome with the first vent groove, fluid connection between the first primary vent aperture (and/or further first vent apertures) in the earpiece housing and the first vent groove is ensured when the dome is correctly aligned with the earpiece housing along the longitudinal axis, without requiring an alignment of the dome with the earpiece housing in an angular direction. Thereby, an easy mounting or alignment of the dome to the earpiece housing is facilitated.

In one or more example earpieces, the proximal surface of the dome has a first secondary vent aperture. The first secondary vent aperture may be in fluid communication with the first vent groove. The first secondary vent aperture allows a fluid, such as air, to flow from the proximal side of the dome to the first vent groove and/or from the first vent groove to the proximal side of the dome.

In one or more example earpieces, the dome comprises a distal surface having a second primary vent aperture in a distal surface. The second primary vent aperture in the dome may be arranged to be in fluid communication with the second primary vent aperture in the earpiece housing. The first secondary vent aperture allows a fluid, such as air, to flow from the second primary vent aperture in the earpiece housing to a distal side of the dome or vice versa.

In one or more example earpieces, the vent apertures of the dome, such as the first primary vent aperture and/or the second primary vent aperture and/or the first secondary vent aperture and/or the second secondary vent aperture may be configured to hold a filter device, such as a respective filter device, for preventing cerumen from entering the vent apertures of the dome. Thereby, the vent apertures of the dome may be prevented from clogging up, which could otherwise cause a degradation of the sound quality and subsequently a malfunction of the hearing device. Arranging filter devices in the vent apertures of the dome also reduces the risk of the vent apertures, such as the first primary and the second primary vent apertures in the earpiece housing from clogging up, since cerumen is prevented from reaching the vent apertures in the earpiece housing via the vent apertures in the dome.

In one or more example earpieces, the inner surface of the dome comprises a second vent groove being in fluid communication with the second primary vent aperture of the dome. The second vent groove may be aligned with the second primary vent aperture in the earpiece housing along the longitudinal axis. The second vent groove may be circumferentially arranged along the inner surface of the dome. The second vent groove may be arranged distal to the first vent groove. The second vent groove may have a second depth, e.g., in the range from 0.2 mm to 2 mm. The second depth may be the same or greater or smaller than the first depth. The second vent groove may extend fully or partly along the circumference of the inner surface. The second vent groove may extend perpendicular to the longitudinal axis. By providing the inner surface of the dome with the second vent groove, fluid connection between the second primary vent aperture (and/or further second vent apertures) in the earpiece housing and the second vent groove is ensured when the dome is correctly aligned with the earpiece housing along the longitudinal axis, without requiring an alignment of the dome with the earpiece housing in an angular direction. Thereby, an alignment of the dome to the earpiece housing is facilitated.

In one or more example earpieces, the outer surface of the earpiece housing comprises a first vent groove being in fluid communication with the first primary vent aperture of the earpiece housing. The first vent groove may be aligned with the first primary vent aperture in the dome along the longitudinal axis. The first vent groove may be circumferentially arranged along the outer surface of the earpiece housing. By providing the outer surface of the earpiece housing with the first vent groove, fluid connection between the first primary vent aperture in the dome and the first vent groove in the earpiece housing is ensured when the dome is correctly aligned with the earpiece housing along the longitudinal axis, without requiring an alignment of the dome with the earpiece housing in an angular direction. Thereby, an alignment of the dome to the earpiece housing is facilitated.

In one or more example earpieces, the outer surface of the earpiece housing comprises a second vent groove being in fluid communication with the second primary vent aperture of the earpiece housing. The second vent groove may be aligned with the second primary vent aperture in the dome along the longitudinal axis. The second vent groove may be circumferentially arranged along the outer surface of the earpiece housing. The second vent groove of the earpiece housing may be arranged distal to the first vent groove of the earpiece housing. By providing the outer surface of the earpiece housing with the second vent groove, fluid connection between the second primary vent aperture in the dome and the second vent groove in the earpiece housing is ensured when the dome is correctly aligned with the earpiece housing along the longitudinal axis, without requiring an alignment of the dome with the earpiece housing in an angular direction. Thereby, an alignment of the dome to the earpiece housing is facilitated and a correct functioning of the vent mechanism can be ensured.

In one or more example earpieces, the outer surface of the earpiece housing comprises a first protrusion, optionally wherein the first vent aperture(s) of the earpiece housing is formed in the first protrusion. The first protrusion may be aligned with the first vent groove of the inner surface of the dome along the longitudinal axis. The first protrusion may have a first height, e.g., in the range from 0.2 mm to 2 mm. The first height of the first protrusion may be less than the first depth of the first vent groove in the dome to ensure fluid communication via the first groove in the dome. The first protrusion may be circumferentially arranged along the outer surface of the earpiece housing. The first protrusion may extend fully or partly along the circumference of the outer surface. The first protrusion may extend perpendicular to the longitudinal axis. By providing the outer surface of the earpiece housing with the first protrusion, the dome may be further secured to the earpiece housing. The first protrusion may comprise a plurality of first protrusion parts arranged along the circumference of the outer surface in the first position.

In one or more example earpieces, the outer surface of the earpiece housing comprises a second protrusion, optionally wherein the second vent aperture(s) of the earpiece housing is formed in the second protrusion. The second protrusion may be aligned with the second vent groove of the inner surface of the dome along the longitudinal axis. The second protrusion may have a second height, e.g., in the range from 0.2 mm to 2 mm. The second height of the second protrusion may be less than the second depth of the second vent groove in the dome to ensure fluid communication via the second groove in the dome. The second protrusion may be circumferentially arranged along the outer surface of the earpiece housing. The second protrusion may extend fully or partly along the circumference of the outer surface. The second protrusion may extend perpendicular to the longitudinal axis. By providing the outer surface of the earpiece housing with the second protrusion, the dome may be further secured to the earpiece housing. The second protrusion may comprise a plurality of second protrusion parts arranged along the circumference of the outer surface in the second position.

In one or more example earpieces, the distal surface of the dome has a second secondary vent aperture in fluid communication with the second vent groove of the inner surface of the dome and/or of the outer surface of the earpiece housing. Thus, the second secondary vent aperture may be in fluid communication with the second vent aperture of the earpiece housing via the second vent groove.

In one or more example earpieces, the first primary vent aperture of the earpiece housing is proximal to the second primary vent aperture of the earpiece housing. In other words, the first primary vent aperture may be arranged at a first distance from the proximal end of earpiece housing and the second vent apertures may be arranged at a second distance from the proximal end of earpiece housing. The second distance may be larger than the first distance.

In one or more example earpieces, the earpiece part comprises a vent mechanism arranged in the earpiece housing, and wherein the vent mechanism is arranged between the first primary vent aperture and the second primary vent aperture of the earpiece housing and configured to open and close the vent path.

The vent mechanism may be an active vent mechanism. The vent mechanism being active can herein be seen as the vent mechanism being configured to open and close a vent path (such as a vent pathway, an air path, a sound path, a fluid path, and/or a fluid communication). The vent mechanism can be configured to be open in a first state. The vent mechanism can be configured to be closed in a second state.

The vent mechanism may comprise one or more movable components. The opening and closing of the vent mechanism may be done by moving one or more of the movable components of the vent mechanism. The vent mechanism may comprise an actuator for moving the one or more movable components of the vent mechanism. The actuator may be a magnetic actuator, such as a microelectromechanical systems (MEMS) magnetic actuator and or an electrical actuator.

The vent path can pass at least partially through the earpiece housing. The vent mechanism can comprise any mechanical mechanism that opens and closes the vent path. In one or more exemplary earpieces, the vent mechanism may be operated electronically and/or automatically and/or manually and/or mechanically. The opening and closing of the vent mechanism may not be audible to the user.

In one or more exemplary earpieces, the vent mechanism can include a circumferential rim extending around an inner surface of the earpiece housing. The circumferential rim may be a part of the earpiece housing. The circumferential rim may be attached to the earpiece housing. The circumferential rim may form an aperture (e.g., hole, empty space, opening, gap) within the earpiece housing. The circumferential rim may include mating features.

In some example vent mechanisms, the vent mechanism may include a plug that can move in the earpiece housing. For example, the plug can move longitudinally along the longitudinal axis of the earpiece. The plug can form an airtight seal with the circumferential rim when in the closed position, thus closing a vent path. When the plug is moved away from the circumferential rim, regardless of the type of motion, the vent path may be opened. The plug may have a diameter greater than the inner diameter of the circumferential rim. The plug may be flat. The plug may include an extension that fits within an aperture in the circumferential rim. The plug may include corresponding mating features to mate with the mating features of the circumferential rim. The plug and/or circumferential rim may include a sealing material for improving sealing between the plug and circumferential rim.

Other vent mechanisms can be used as well, and the particular vent mechanism is not limiting. For example, the vent mechanism can include rotational components. Alternatively, the vent mechanism can include translational components. In one or more exemplary earpieces, the vent mechanism can include both rotational and translatable components.

The vent mechanism is generally used to open and close the vent path. When the vent mechanism is open, the vent mechanism allows air to flow through the earpiece between a proximal end and a distal end of the earpiece. When closed, the vent mechanism prevents air from flowing through the vent path in the earpiece, e.g., between a proximal end and a distal end of the earpiece and/or between a distal side and a proximal side of the vent mechanism. Thus, the vent mechanism can prevent fluid communication when closed. This can advantageously allow for improved sound quality when a user is for example listening to music. For example, the vent mechanism can be closed so that the user can experience improved bass hearing, in particular during music playback. However, this may reduce the sound received from the environment when the vent is closed. However, when the user desires to hear the surrounding environment, the vent mechanism can be opened to avoid undesired occlusion effects.

In one or more example earpieces, the earpiece housing comprises a flange arranged at the proximal end of the earpiece housing for securely attaching the dome to the earpiece housing. The flange may be configured to secure the dome in a longitudinal direction of the earpiece. In one or more example earpieces, the flange may be arranged circumferentially along the outer surface of the earpiece housing. In one or more example earpieces, the flange may be arranged along a section of the outer surface of the earpiece housing. The dome may comprise a corresponding groove for receiving the flange arranged at the proximal end of the earpiece housing.

An earpiece part for an earpiece of a hearing device is disclosed. The earpiece part comprises an earpiece housing having a distal end, a proximal end, and an outer surface connecting the distal end to the proximal end. The earpiece housing comprises a first primary vent aperture and/or a second primary vent aperture. The earpiece housing may comprise a plurality of first vent apertures including the first primary vent aperture and a first secondary vent aperture in the outer surface. The earpiece housing may comprise a plurality of second vent apertures including the second primary vent aperture and a second secondary vent aperture in the outer surface. First vent aperture(s) in the outer surface of the earpiece housing may be proximal to second vent aperture(s) in the outer surface of the earpiece housing. Thus, the first primary vent aperture of the earpiece housing is optionally proximal to the second primary vent aperture of the earpiece housing. One or more first vent aperture(s) may be arranged at first distance from a proximal end of the earpiece housing and one or more second vent aperture(s) may be arranged at second distance from the proximal end of the earpiece housing, wherein the second distance is larger than the first distance. Unless otherwise noted, the earpiece part can comprise the same features as discussed above with respect to the earpiece part of the earpiece.

In one or more example earpiece housings, the earpiece part comprises a vent mechanism arranged between the first primary vent aperture and the second primary vent aperture of the earpiece housing. The vent mechanism may be configured to open and close a vent path between the first primary vent aperture and the second primary vent aperture. The vent mechanism may be any vent mechanism disclosed herein, such as the vent mechanism disclosed in relation to the earpiece.

A dome for an earpiece of a hearing device is disclosed. The dome is configured for securing the earpiece in an ear canal, such as in an ear canal of a user of the earpiece. The dome has an inner surface forming a cavity and configured for extending circumferentially along an outer surface of an earpiece housing. In other words, the cavity is configured to accommodate at least a part of the earpiece housing. The dome comprises a proximal surface having a first primary vent aperture, wherein the first primary vent aperture is in fluid communication with the cavity. Unless otherwise noted, the dome can comprise the same features as discussed above with respect to the dome of the earpiece. The dome may be formed as a plug or shell manufactured to fit snugly in the ear canal of the user, e.g., by manufacturing the dome according to an impression made of the ear canal or by manufacturing the dome as a generically shaped dome made from a resilient material, e.g., a silicone-based elastomeric material. The dome may be made from a plastic material with a smooth outer surface for comfort, stability, and hygienic reasons.

The hearing device may be configured for wireless communication with one or more devices, such as with another hearing device, e.g., as part of a binaural hearing system, and/or with one or more accessory devices, such as a smartphone and/or a smart watch. The hearing device optionally comprises an antenna for converting one or more wireless input signals, e.g., a first wireless input signal and/or a second wireless input signal, to antenna output signal(s). The wireless input signal(s) may origin from external source(s), such as spouse microphone device(s), wireless TV audio transmitter, and/or a distributed microphone array associated with a wireless transmitter. The wireless input signal(s) may origin from another hearing device, e.g., as part of a binaural hearing system, and/or from one or more accessory devices.

The hearing device optionally comprises a radio transceiver coupled to the antenna for converting the antenna output signal to a transceiver input signal. Wireless signals from different external sources may be multiplexed in the radio transceiver to a transceiver input signal or provided as separate transceiver input signals on separate transceiver output terminals of the radio transceiver. The hearing device may comprise a plurality of antennas and/or an antenna may be configured to be operate in one or a plurality of antenna modes. The transceiver input signal optionally comprises a first transceiver input signal representative of the first wireless signal from a first external source.

The hearing device comprises a set of microphones. The set of microphones may comprise one or more microphones. The set of microphones comprises a first microphone for provision of a first microphone input signal and/or a second microphone for provision of a second microphone input signal. The set of microphones may comprise N microphones for provision of N microphone signals, wherein N is an integer in the range from 1 to 10. In one or more exemplary hearing devices, the number N of microphones is two, three, four, five or more. The set of microphones may comprise a third microphone for provision of a third microphone input signal. The set of microphones may be arranged in the earpiece housing of the earpiece and/or in a secondary earpiece housing, such as in an earpiece housing arranged behind the ear of a user.

The hearing device optionally comprises a pre-processing unit. The pre-processing unit may be connected to the radio transceiver for pre-processing the transceiver input signal. The pre-processing unit may be connected the first microphone for pre-processing the first microphone input signal. The pre-processing unit may be connected the second microphone if present for pre-processing the second microphone input signal. The pre-processing unit may comprise one or more A/D-converters for converting analog microphone input signal(s) to digital pre-processed microphone input signal(s).

The hearing device comprises a processor for processing input signals, such as pre-processed transceiver input signal and/or pre-processed microphone input signal(s). The processor provides an electrical output signal based on the input signals to the processor. Input terminal(s) of the processor are optionally connected to respective output terminals of the pre-processing unit. For example, a transceiver input terminal of the processor may be connected to a transceiver output terminal of the pre-processing unit. One or more microphone input terminals of the processor may be connected to respective one or more microphone output terminals of the pre-processing unit.

The hearing device comprises a processor for processing input signals, such as pre-processed transceiver input signal (s) and/or pre-processed microphone input signal(s). The processor is optionally configured to compensate for hearing loss of a user of the hearing device. The processor provides an electrical output signal based on the input signals to the processor. Input terminal(s) of the processor are optionally connected to respective output terminals of the pre-processing unit. For example, a transceiver input terminal of the processor may be connected to a transceiver output terminal of the pre-processing unit. One or more microphone input terminals of the processor may be connected to respective one or more microphone output terminals of the pre-processing unit.

FIG. 1 shows a part of an exemplary earpiece part 4 for an earpiece of a hearing device. The earpiece part 4 has an earpiece axis X_E. The earpiece axis X_E may be a longitudinal axis of the earpiece part 4 and/or of the earpiece. The earpiece part 4 comprises an earpiece housing 5 having a proximal end 6, a distal end 7, and an outer surface 8 connecting the distal end 7 to the proximal end 6. The proximal end 6 is the end closest to an ear drum 50 of the user when the earpiece 3 is inserted into the ear of the user. The distal end 7 is the end furthest away from the ear drum 50 of the user when the earpiece 3 is inserted into the ear of the user. The earpiece housing 5 comprises a first primary vent aperture 9, such as one or more first primary vent apertures 9, and a second primary vent aperture 10, such as one or more first primary vent apertures 10, in the outer surface 8. The first primary vent aperture 9 of the earpiece housing 5 is proximal to the second primary vent aperture 10 of the earpiece housing 5. In other words, the first primary vent aperture 9 is arranged closer to the ear drum 50 than the second primary vent aperture 10, when the earpiece 3 is arranged in the ear of a user. The one or more first primary vent aperture(s) 9 are arranged at first distance from the proximal end 6 of the earpiece housing 5 and the one or more second vent aperture(s) 10 are arranged at a second distance from the proximal end 6 of the earpiece housing 5. The second distance is larger than the first distance. The earpiece housing 5 has a sound outlet 20 at the proximal end 6 of the earpiece housing 5 and separate from the first vent apertures. The sound outlet 20 is in the example earpiece part 4 shown in FIG. 1 an aperture in the earpiece housing 5, such as in the proximal end of the earpiece housing 5. In the example earpiece part 4 shown in FIG. 1 the sound outlet 20 is arranged in a nozzle 12 of the earpiece housing 5. The sound outlet 20 may have an outlet area, the outlet area having a normal. In the exemplary earpiece part shown in FIG. 1 the normal of the outlet area of the sound outlet 20 is arranged parallel to a longitudinal axis of the earpiece part 4 and/or of the earpiece housing 5, such as parallel to the earpiece axis X_E.

The example earpiece part 4 shown in FIG. 1 comprises a vent mechanism 18 arranged between the first primary vent aperture 9 and the second primary vent aperture 10 of the earpiece housing 5. The vent mechanism 18 may be configured to open and close the vent path 17 between the first primary vent aperture 9 and the second primary vent aperture 10. When the vent mechanism 18 is open, the vent mechanism 18 allows air to flow through the earpiece part 4, between a proximal end and a distal end of the earpiece 3. When closed, the vent mechanism 18 prevents air from flowing through the vent path 17 in the earpiece part 4, e.g., between a proximal end and a distal end of the earpiece part 4 and/or between a distal side and a proximal side of the vent mechanism 18. Thus, when the vent mechanism 18 is closed the vent mechanism 18 prevents the first primary vent aperture 9 and the second primary vent aperture 10 from being in fluid communication.

The exemplary earpiece housing 5 shown in FIG. 1 comprises a flange 19 arranged at the proximal end 6 of the earpiece housing 5 for securely attaching a dome to the earpiece housing 5. The flange 19 is configured to mate with a corresponding groove for receiving the flange 19 in the dome. The flange 19 is configured to secure the dome to the earpiece housing 5 in a longitudinal direction of the earpiece housing 5. In one or more example earpieces, the flange 19 is arranged circumferentially along the outer surface 8 of the earpiece housing 5. The flange 19 is arranged along a section of the outer surface 8 of the earpiece housing 5. In the exemplary earpiece housing 5 shown in FIG. 1, the flange 19 is arranged on the outer surface 8 at the proximal end of the earpiece housing 5. The flange 19 is arranged on the earpiece housing 5 so that, when a dome with a corresponding groove for receiving the flange 19 is arranged on the earpiece housing 5, the first primary vent aperture and/or the first vent groove of the dome is aligned and/or overlaps with the first primary vent aperture 9 of the earpiece housing 5 in a longitudinal direction of the earpiece housing 5.

Figure 2:
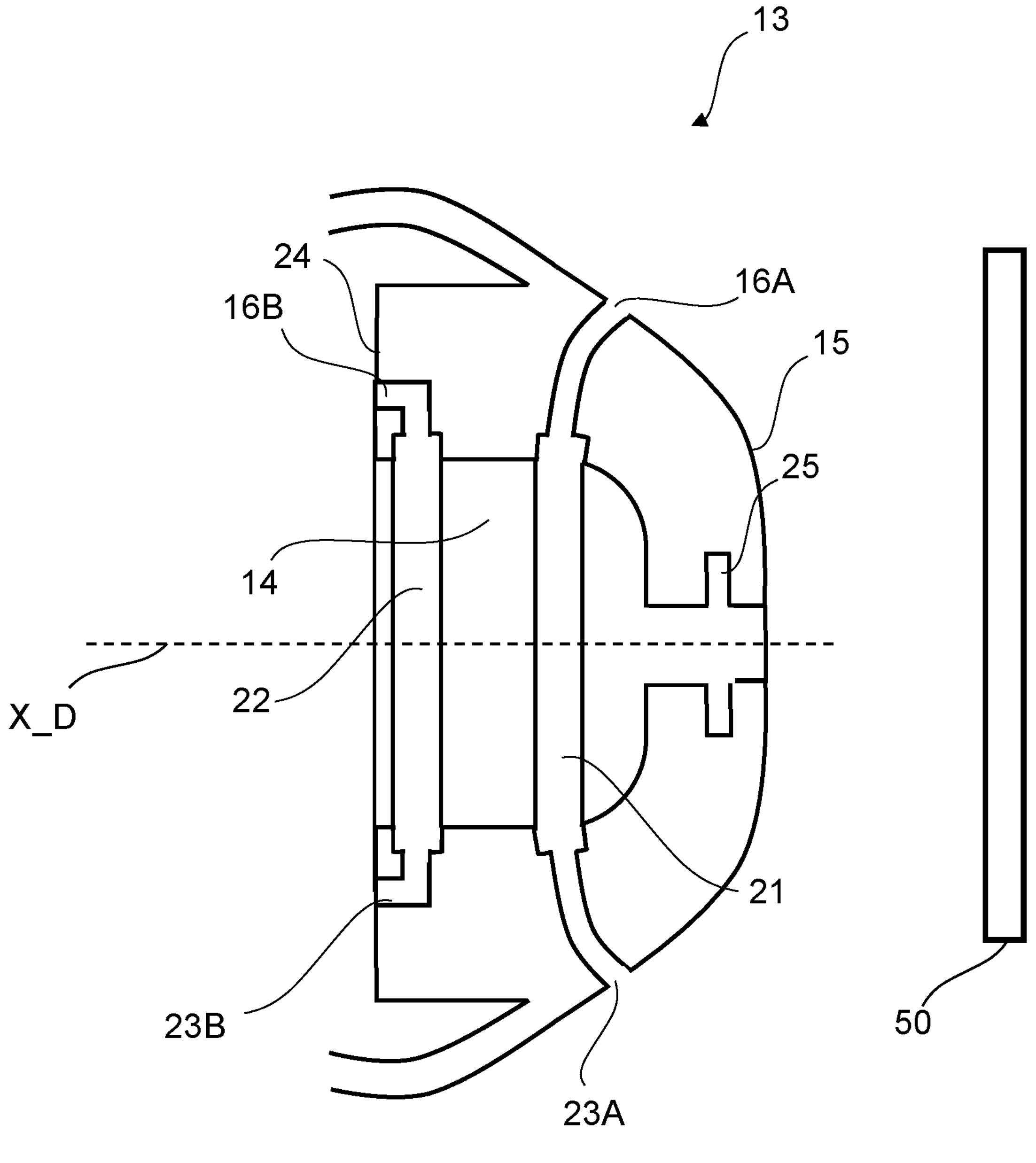

FIG. 2 shows an exemplary dome 13 for an earpiece of a hearing device. The dome 13 is configured for securing the earpiece in the ear canal of the user. The dome has a dome axis X_D. The dome axis X_D may be a longitudinal axis of the dome 13. The dome 13 has an inner surface 14 configured to extend circumferentially along an outer surface of an earpiece housing of an earpiece housing part, such as along the outer surface 8 of the earpiece housing part 4 shown in FIG. 1. The dome 13 comprises a proximal surface 15 having a first primary vent aperture 16A. The proximal surface 15 of the dome 13 is the surface of the dome 13 facing the ear drum 50 when the dome is arranged on an earpiece housing part and the earpiece is inserted into the ear canal of the user. The first primary vent aperture 16A of the dome 13 is configured to align with a first primary vent aperture in the earpiece housing when the dome 13 is arranged on the earpiece housing, so that a vent path forming a fluid communication between the first primary vent aperture 16A of the dome 13 and a first primary vent aperture of an earpiece housing is formed, such as the first primary vent aperture 9 of the earpiece housing 5 of the earpiece part 4 of FIG. 1.

In the example dome 13 shown in FIG. 2, the inner surface 14 of the dome 13 comprises a first vent groove 21 being in fluid communication with the first primary vent aperture 16A in the dome 13. The first primary vent aperture 16A is a throughgoing hole and/or a channel in the dome 13, extending from the proximal surface 15 of the dome 13 to the inner surface 14 of the dome 13. The first primary vent aperture allows air to flow between the proximal surface 15 of the dome 13 to the inner surface 14 of the dome 13. The first vent groove 21 is configured to be aligned with the first primary vent aperture in the earpiece housing along the longitudinal axis, such as along the earpiece housing axis X_EH. The first vent groove 21 is circumferentially arranged along the inner surface 14 of the dome 13. By providing the inner surface 14 of the dome 13 with the first vent groove 21, a fluid connection between the first primary vent aperture in the earpiece housing and the first vent groove 21 of the dome 13 can be ensured when the dome 13 is correctly aligned with the earpiece housing along the earpiece axis, without requiring an alignment of the dome 13 with the earpiece housing in an angular direction. Thereby, an alignment of the dome 13 to the earpiece housing is facilitated. The first vent groove 21 has a first depth. The first vent groove 21 may extend fully or partly along the circumference of the inner surface 14. The first vent groove 21 extends perpendicular to the longitudinal axis, such as the dome axis X_D. The exemplary dome 13 further comprises secondary vent apertures 23. In the example dome 13 shown in FIG. 2, the proximal surface 15 of the dome 13 has a first secondary vent aperture 23A. The first secondary vent aperture 23A is in fluid communication with the first vent groove 21. The first secondary vent aperture 23A allows a fluid, such as air, to flow from the proximal side of the dome 13, such as from the proximal surface 15 of the dome 13 to the first vent groove 21 and/or from the first vent groove 21 to the proximal side of the dome 13.

The exemplary dome 13 of FIG. 2 comprises a distal surface 24 having a second primary vent aperture 16B in the distal surface 24. The second primary vent aperture 16B in the dome 13 is configured to be in fluid communication with the second primary vent aperture in the earpiece housing when the dome 13 is arranged on the earpiece housing. The second primary vent aperture 16B is configured to allow a fluid, such as air, to flow from the second primary vent aperture in the earpiece housing to a distal side of the dome 13 or vice versa. The distal surface 24 further has a second secondary vent aperture 23B in the distal surface 24. The second secondary vent aperture 23B is configured to be in fluid communication with the second primary vent aperture in the earpiece housing when the dome 13 is arranged on the earpiece part 4.

In the exemplary dome 13 of FIG. 2, the inner surface 14 of the dome 13 comprises a second vent groove 22 being in fluid communication with the second primary vent aperture 16B of the dome 13. The second vent groove 22 is configured to be aligned with the second primary vent aperture 10 in the earpiece housing along the longitudinal axis, when the dome is arranged on the earpiece housing part. The second vent groove 22 is circumferentially arranged along the inner surface 14 of the dome 13. The second vent groove 22 is arranged distal to the first vent groove 21. By providing the inner surface 14 of the dome 13 with the second vent groove 22, fluid connection between the second primary vent aperture in the earpiece housing and the second vent groove 22 is ensured when the dome 13 is arranged on, and correctly aligned with, the earpiece housing along the longitudinal axis. The second vent groove 22 may have a second depth. The second depth may be the same or greater or smaller than the first depth of the first vent groove 21. The second vent groove 22 may extend fully or partly along the circumference of the inner surface 14 of the dome 13. The second vent groove 22 may extend perpendicular to the longitudinal axis, such as the dome axis X_D The exemplary dome 13 of FIG. 3 further comprises a groove 25 for receiving a flange arranged at a proximal end of the earpiece housing for securing the dome 13 to the earpiece housing 5. The groove 25 is arranged circumferentially along the inner surface 14 of the dome 13. The groove is arranged on the inner surface 14 of the dome 13, such that when the dome 13 is arranged on the earpiece housing 13 and the flange is received in the groove 25, the first primary vent aperture 16A and/or the first vent groove 21 is correctly aligned and in fluid communication with the first primary vent aperture of the earpiece housing 5. Thus, an alignment of the dome 13 with the earpiece housing in an angular direction is not required to ensure fluid communication between the second primary vent apertures of the earpiece housing and the second primary vent aperture 16B in the dome 13. Thereby, a mounting and aligning of the dome 13 to the earpiece housing is facilitated.

Figure 3:
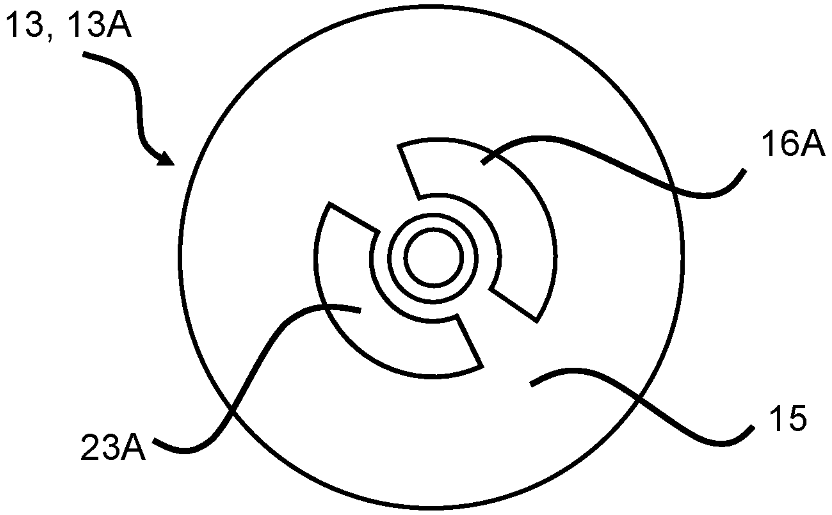

FIG. 3 shows an exemplary dome 13 for an earpiece of a hearing device seen from a proximal side along a longitudinal axis of the dome 13. The dome 13 comprises a proximal surface 15 facing the ear drum of the user when the dome 13 is arranged on an earpiece housing and the earpiece is inserted into the ear canal of the user. In the exemplary dome 13 of FIG. 3, the proximal surface 15 has a circular shape. The proximal surface 15 has the first primary vent aperture 16A and the first secondary vent aperture 23A. The first primary vent aperture 16A and the first secondary vent aperture 23A connect the proximal surface 15 with the inner surface 14 of the dome 13 for allowing fluid communication between the proximal surface 15 and the inner surface 14 of the dome 13. The first primary vent aperture 16A may be in fluid communication with the first vent groove (not shown in FIG. 3) being arranged circumferentially on the inner surface 14 of the dome 13. The first secondary vent aperture 23A may be in fluid communication with the first vent groove (not shown in FIG. 3) being arranged circumferentially on the inner surface 14 of the dome 13. In the exemplary dome 13 shown in FIG. 3, the first primary vent aperture 16A and the first secondary vent aperture 23A are evenly distributed around the circumference of the dome, such as arranged at a 180-degree angle from each other.

Figure 4:
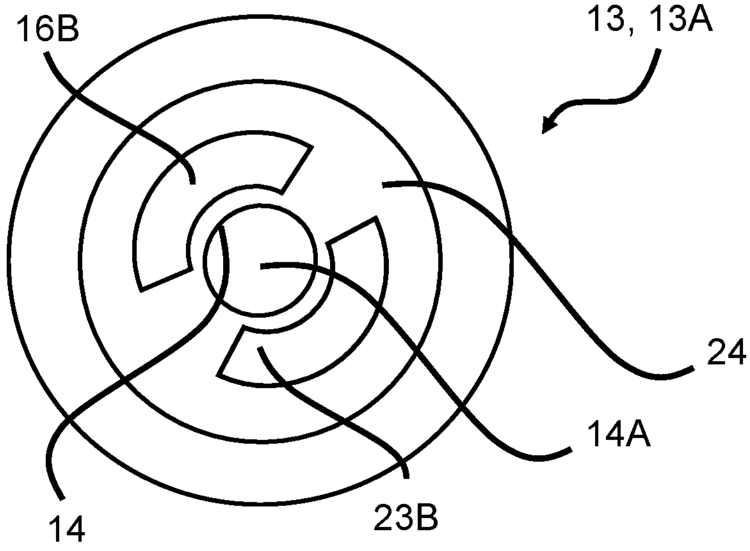

FIG. 4 shows an exemplary dome 13 for an earpiece of a hearing device seen from a distal side along the longitudinal axis of the dome 13. The dome 13 has an inner surface 14 forming a cavity 14A. The inner surface 14 is configured for extending circumferentially along an outer surface of an earpiece housing, such as around the outer surface 8 of the exemplary earpiece housings 5, 5A, 5B or 5C shown in FIG. 1 and FIG. 7-9. In other words, the cavity 14A is configured to accommodate at least a part of the earpiece housing, such as at least a part of the earpiece housing 5, 5A, 5B, 5C. The dome 13 comprises a distal surface 24 facing away from the ear drum 50 of the user when the dome 13 is arranged on an earpiece housing and the earpiece is inserted into the ear canal of the user. In the exemplary dome 13 of FIG. 4, the distal surface 24 has a circular shape. The distal surface 24 has the second primary vent aperture 16B and the second secondary vent aperture 23B. The second primary vent aperture 16B and the first secondary vent aperture 23B connect the distal surface 24 with the inner surface 14 of the dome 13 for allowing fluid communication between the distal surface 24 and the inner surface 14 of the dome 13. The second primary vent aperture 16B can be in fluid communication with the second vent groove (not shown in FIG. 4) being arranged circumferentially on the inner surface 14 of the dome 13. The second secondary vent aperture 23B may be in fluid communication with the second vent groove (not shown in FIG. 4) being arranged circumferentially on the inner surface 14 of the dome 13. In the exemplary dome 13 shown in FIG. 3, the second primary vent aperture 16B and the second secondary vent aperture 23B are evenly distributed around the circumference of the dome, such as arranged at a 180-degree angle from each other.

Figure 5:
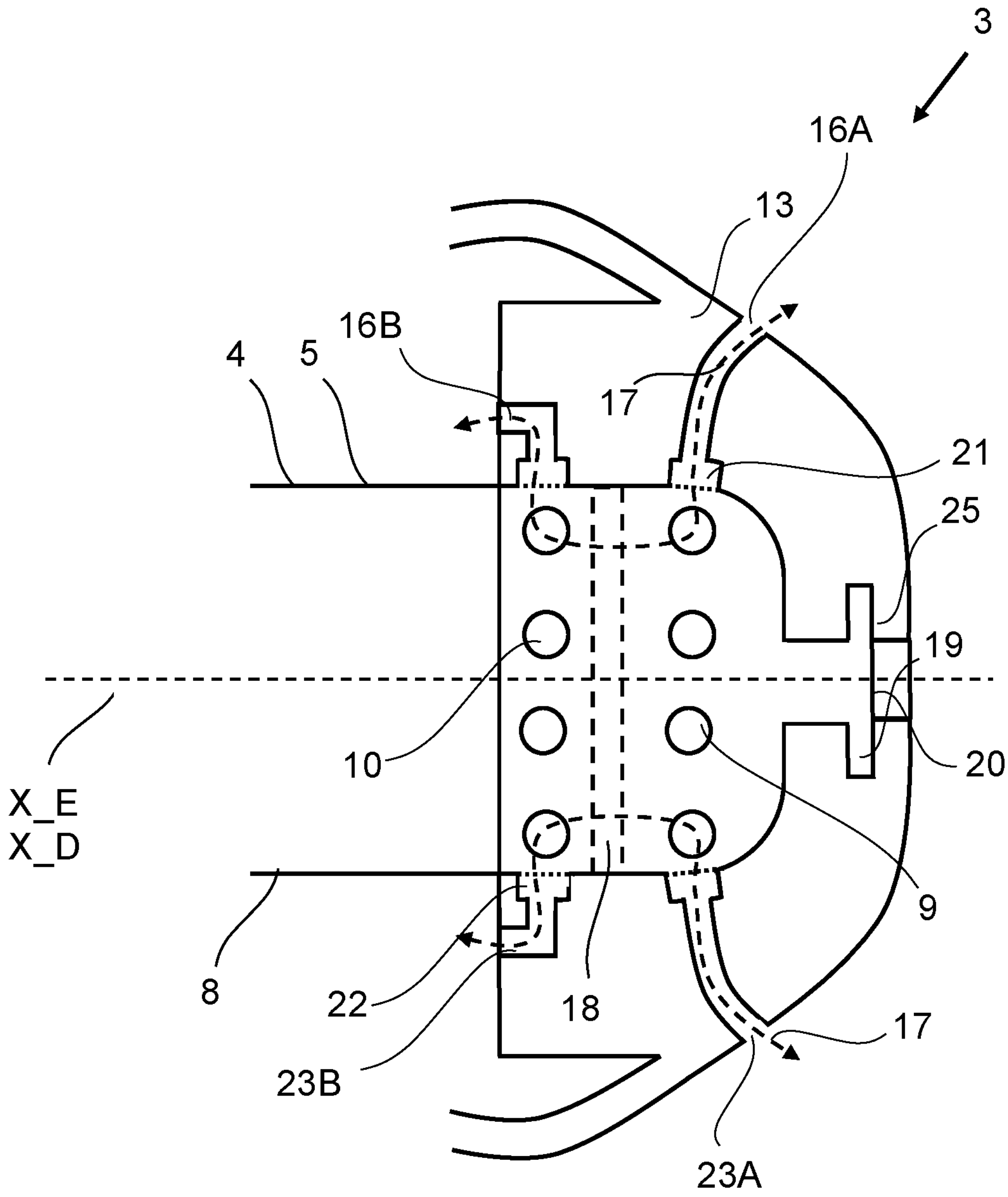

FIG. 5 shows a part of an exemplary earpiece 3 for a hearing device. The earpiece 3 comprises an earpiece part 4 and a dome 13 in cross-section. The earpiece part 4 may be the earpiece part 4 shown in FIG. 1 and comprising an earpiece housing 5 having a distal end 6, a proximal end 7, and an outer surface 8 connecting the distal end 5 to the proximal end 6. The proximal end 6 can herein be seen as the end closest to an ear drum of the user when the earpiece 3 is inserted into the ear of the user. The distal end 7 can herein be seen as the end furthest away from an ear drum of the user when the earpiece 3 is inserted into the ear of the user. The earpiece housing 5 comprises a first primary vent aperture 9 and a second primary vent aperture 10 in the outer surface 8, such as in the outer surface of the earpiece housing. The first primary vent aperture 9 and the second primary vent aperture 10 allow fluid communication, such as air flow, through the outer surface 8 of the earpiece housing 5, such that air can enter or leave the earpiece housing 5 through the first primary vent aperture 9 and the second primary vent aperture 10. In the example earpiece 3 of FIG. 5, the first primary vent aperture 9 is arranged proximal to the second primary vent aperture 10. The earpiece part 4 comprises a receiver 11 arranged within the earpiece housing 5. The receiver 11 has a receiver axis X_R. The receiver axis X_R may be a longitudinal center axis of the receiver 11. The receiver 11 may comprise a receiver membrane. The receiver axis X_R may be perpendicular to a normal of the receiver membrane. The earpiece 3 comprises a dome 13 for securing the earpiece in the ear canal, such as the dome 13 shown in FIGS. 2-4. The dome 13 is arranged on the arranged on the proximal end 6 of the earpiece part 4. The dome 13 has an inner surface 14 extending circumferentially along the outer surface 8 of the earpiece housing 5. The dome 13 comprises a proximal surface 15 having a first primary vent aperture 16A and a first secondary vent aperture 23A. The earpiece 3 comprises a vent path 17 forming a fluid communication between the first primary vent aperture 16A and/or the first secondary vent aperture 23A of the dome 13 and the second primary vent aperture 10 of the earpiece housing 5 via the first primary vent aperture 9 of the earpiece housing 5. The vent path 17 allows air to flow through at least a part of the earpiece housing 5, such as from the proximal end 6 of the earpiece housing to a distal end 7 of the earpiece housing and/or from the distal end 7 of the earpiece housing to the proximal end 6 of the earpiece housing. In other words, when the earpiece 3 is assembled the vent apertures in the dome 13 and in the earpiece part 4 form the vent path 17 of the earpiece 3. The vent path 17 is thus routed through or extends through both the dome 13 and the earpiece part 4. Air can thus flow from a proximal side of the earpiece 3 via the first primary vent aperture 16A and/or the first secondary vent aperture 23A in the dome 13, through at least a part of the earpiece housing 5 via the first primary vent aperture 9 and the second primary vent aperture 10 of the earpiece housing 4, to a distal side of the earpiece 3 via the second primary vent aperture 16B and/or the second secondary vent aperture 23B arranged in the distal surface 24 of the dome 13. By routing the vent path 17 through the dome 13 via the first primary vent aperture 9, the dimensions of the proximal end of the earpiece housing 4, such as of the sound outlet of the earpiece housing, can be reduced. This can allow for ease of fit of the earpiece 3 with a user. Further, reducing the size of the proximal end of the earpiece housing 4 facilitates insertion and withdrawal of the earpiece 3 from an ear of the user, e.g., by provision of an improved attachment of the dome 13 to the earpiece housing 4. Furthermore, the risk of the earpiece 3 and/or parts of the earpiece 3 getting stuck inside the ear can be reduced. Reducing, the size of the proximal end of the earpiece housing 4 also allows for an improved form factor of the earpiece 3 and/or the dome 13 which can increase the wearing comfort to a user of the earpiece 3.

In the exemplary earpiece 3, shown in FIG. 5, the inner surface 14 of the dome 13 comprises the first vent groove 21. The first vent groove 21 is in fluid communication with the first primary vent aperture 16A and the first secondary vent aperture 23A in the dome. The first vent groove 21 is aligned with, or at least overlaps with, and is in fluid communication with one or more first primary vent aperture(s) 9 in the earpiece housing 5 along the earpiece axis X_E. The first vent groove 21 is circumferentially arranged along the inner surface 14 of the dome 13. Thereby, fluid connection between the first primary vent aperture 9 in the earpiece housing 5 and the first vent groove 21 is ensured when the dome 13 is correctly aligned with the earpiece housing 5 along the earpiece axis X_E, regardless of the angular position of the dome 13 on the earpiece housing 5. Thereby, an alignment of the dome 13 to the earpiece housing 4 is facilitated. The inner surface 14 of the dome 13 further comprises the second vent groove 22 circumferentially arranged along the inner surface 14 of the dome 13. The second vent groove 22 is aligned and in fluid communication with the second primary vent aperture(s) 10 in the earpiece housing 5 along the earpiece housing axis X_EH. The second vent groove 22 is in fluid communication with the second primary vent aperture 16B and the second secondary vent aperture 23B in the dome and thus provides fluid communication between the distal surface 24 of the dome 13 and the second primary vent aperture 10 of the earpiece housing.

The exemplary earpiece 3 shown in FIG. 5 comprises a vent mechanism 18 arranged in the earpiece housing 5. The vent mechanism 18 is arranged between the first primary vent aperture 9 and the second primary vent aperture 10 of the earpiece housing 5. And is configured to open and close the vent path 17. In the exemplary earpiece shown in FIG. 5, the earpiece housing 5 comprises the flange 19 arranged at the proximal end of the earpiece housing 5. The flange 19 is arranged in the corresponding groove 25 of the dome 13, so that the dome 13 is aligned with the earpiece housing 5. When the dome 13 is aligned with the earpiece housing 5, the first primary vent aperture 16A, the first secondary vent aperture 23A and/or the first vent groove 21 are aligned and in fluid communication with the first primary vent aperture 9 of the earpiece housing 5. Correspondingly, the second primary vent aperture 16B, the second secondary vent aperture 23B and/or the second vent groove 21 are aligned and in fluid communication with the second primary vent aperture 10 of the earpiece housing 5. The flange 19 thus secures the dome 13 to the earpiece part 4 in an aligned position in the longitudinal direction of the earpiece 3.

Figure 6:
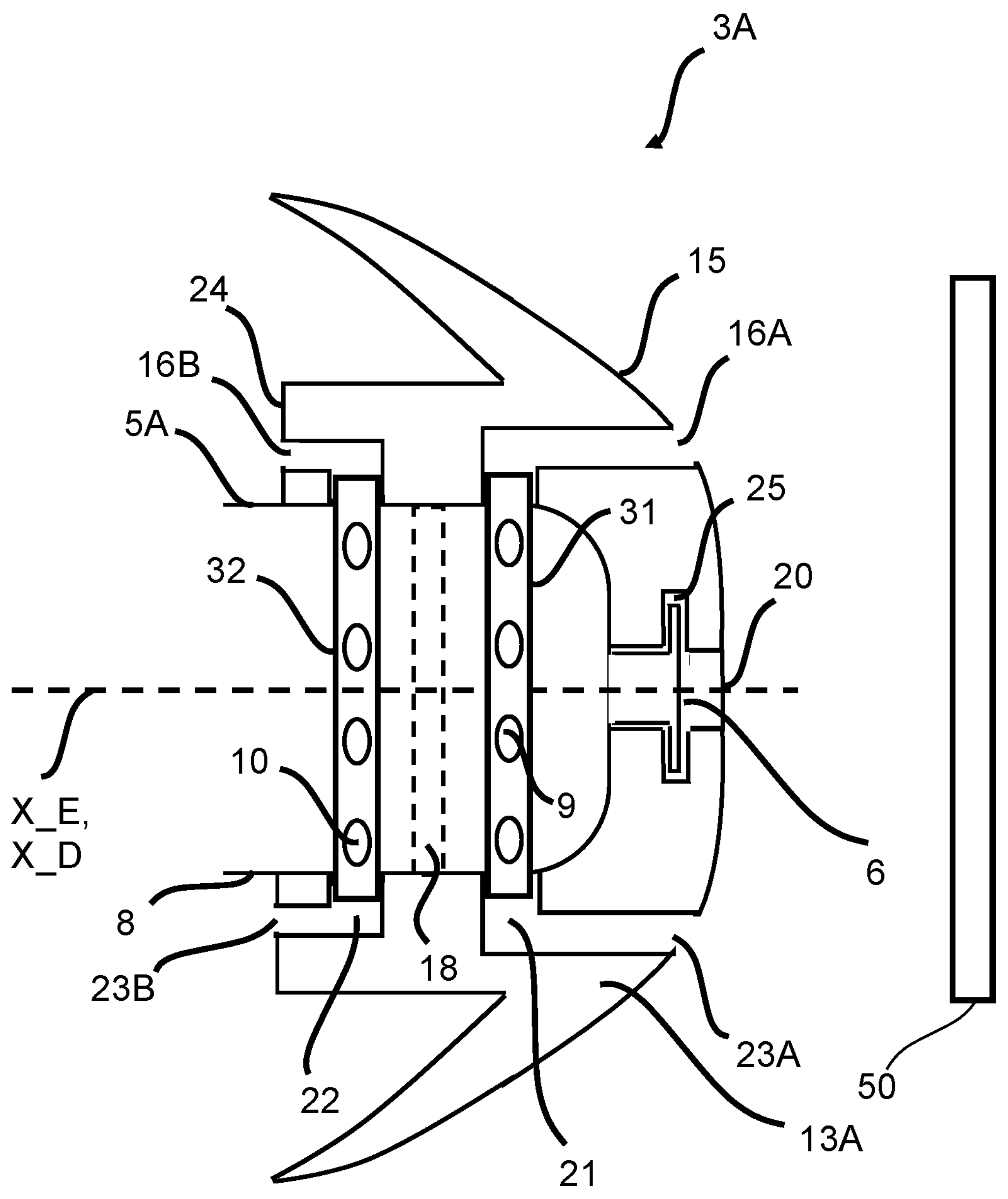
FIG. 6 shows an exemplary earpiece of a hearing device.

FIG. 6 shows a part of an exemplary earpiece 3A. The earpiece 3A comprises an exemplary earpiece housing 5A and an exemplary dome 13A. The outer surface 8 of the earpiece housing 5A comprises a first protrusion 31. The first protrusion 31 is aligned with the first vent groove 21 of the inner surface of the dome 13A along the longitudinal axis, such as along the earpiece axis X_E. The first vent groove 21 of the dome 13A receives the first protrusion 31 and thereby secures the dome 13A to the earpiece housing 5A in the longitudinal direction, such as along the earpiece axis X_E. The first protrusion 31 has a first height. The first height of the first protrusion 31 is less than the first depth of the first vent groove 21 in the dome 13A to ensure fluid communication via the first vent groove 21 in the dome 13A. In other words, by the first height of the first protrusion 31 being less than the first depth of the first vent groove 21 in the dome 13A a cavity is provided between the outer surface of the first protrusion 31 and an inner surface of the first vent groove 21 of the dome 13A through which a fluid can flow. The first protrusion 31 is circumferentially arranged along the outer surface 8 of the earpiece housing 5A. The first protrusion 31 may extend fully or partly along the circumference of the outer surface 8. The first protrusion 31 extends perpendicular to the earpiece axis X_E. By providing the outer surface 8 of the earpiece housing 5A with the first protrusion 31, the dome 13A is further secured to the earpiece housing 5A. The first protrusion 31 may comprise a plurality of first protrusion parts arranged along the circumference of the outer surface in the first position. In the example earpiece housing 5A shown in FIG. 6, the first vent aperture(s) 9 of the earpiece housing 5A is formed in the first protrusion 31. The outer surface 8 of the exemplary earpiece housing 5A comprises a second protrusion 32. The second protrusion 32 is aligned with the second vent groove 22 of the inner surface of the dome 13A along the earpiece axis X_E. The second vent groove 22 of the dome 13A receives the second protrusion 32 and thereby secures the dome 13A to the earpiece housing 5A in the longitudinal direction, such as along the earpiece axis X_E. The second protrusion 32 has a second height. The second height of the second protrusion 32 is less than the second depth of the second vent groove 22 in the dome 13A to ensure fluid communication via the second vent groove 22 in the dome 13A. In other words, by the second height of the second protrusion 32 being less than the second depth of the second vent groove 22 in the dome 13A a cavity is provided between the outer surface of the second protrusion 32 and the inner surface of the second vent groove 22 of the dome 13A through which a fluid can flow. The second protrusion 32 is circumferentially arranged along the outer surface 8 of the earpiece housing 5A. The second protrusion 32 may extend fully or partly along the circumference of the outer surface 8. The second protrusion 32 extends perpendicular to the earpiece axis X_E. By providing the outer surface 8 of the earpiece housing 5A with the second protrusion 32, the dome 13A may be further secured to the earpiece housing 5A. The second protrusion 32 may comprise a plurality of second protrusion parts arranged along the circumference of the outer surface 8 in the second position. In the example earpiece housing 5A shown in FIG. 6, the second vent aperture(s) 10 of the earpiece housing 5A is formed in the second protrusion 32. The first primary vent aperture 16A and the first secondary vent aperture 23A in the exemplary dome 13A are arranged parallel to the dome axis X_D. The second primary vent aperture 16B and the second secondary vent aperture 23B in the exemplary dome 13A are arranged parallel to the dome axis X_D.

Figure 7:
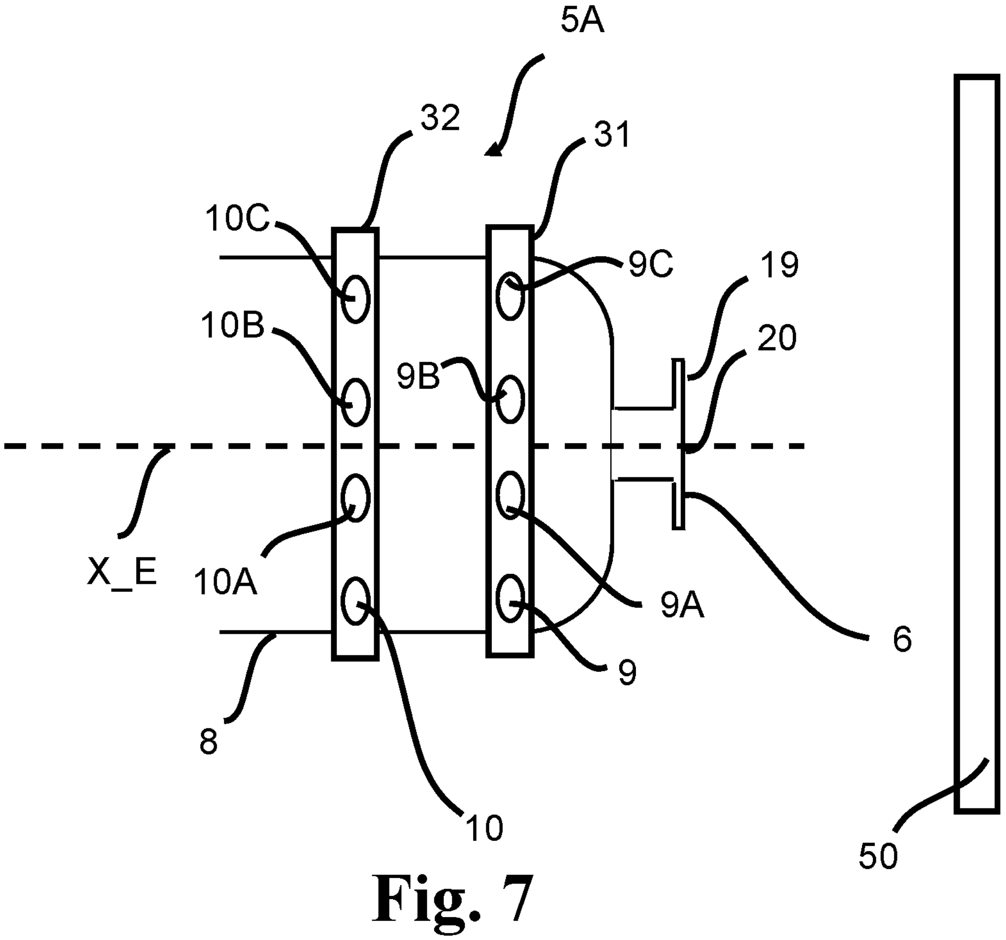
FIG. 7 shows an exemplary earpiece housing of an earpiece.

FIG. 7 shows an exemplary earpiece housing 5A. The exemplary earpiece housing 5A comprises the first protrusion 31 arranged on the outer surface 8 of the earpiece housing 5A and the second protrusion 32 arranged on the outer surface 8 of the earpiece housing 5A. The first protrusion 31 is arranged proximal to the second protrusion 32. The first protrusion 31 is configured to be aligned with the first vent groove 21 of the inner surface of the dome 13A along the longitudinal axis, such as along the earpiece axis X_E, when the dome is mounted to the earpiece housing 5A. The first protrusion 31 has a first height. The first height of the first protrusion 31 is less than a first depth of the first vent groove 21 in the dome 13A to ensure fluid communication via the first vent groove 21 in the dome 13A, when the dome 13A is mounted on the earpiece housing 5A. The first protrusion 31 is circumferentially arranged along the outer surface 8 of the earpiece housing 5A. The first protrusion 31 may extend fully or partly along the circumference of the outer surface 8. The first protrusion 31 extends perpendicular to the earpiece axis X_E. The second protrusion 32 is configured to be aligned with the second vent groove 22 of the inner surface of the dome 13A along the longitudinal axis, such as along the earpiece axis X_E, when the dome is mounted to the earpiece housing 5A. The second protrusion 32 has a second height. The second height of the second protrusion 32 is less than the second depth of the second vent groove 22 in the dome 13A to ensure fluid communication via the second vent groove 22 in the dome 13A. The second protrusion 32 is circumferentially arranged along the outer surface 8 of the earpiece housing 5A. The second protrusion 32 may extend fully or partly along the circumference of the outer surface 8. The second protrusion 32 extends perpendicular to the earpiece axis X_E. A plurality of first vent apertures, such as a first primary vent aperture 9, a first secondary vent aperture 9A, a first tertiary vent aperture 9B, a first quaternary vent aperture 9C, are formed in the first protrusion 31. The first primary vent aperture 9, the first secondary vent aperture 9A, the first tertiary vent aperture 9B and/or the first quaternary vent aperture 9C are arranged around the circumference of the first protrusion 31 and are configured to be in fluid communication with the first vent groove 21 of the dome 13, 13A. A plurality of second vent apertures, such as the second primary vent aperture 10, the second secondary vent aperture 10A, the second tertiary vent aperture 10B and/or the second quaternary vent aperture 100, are formed in the first protrusion 31. The second primary vent aperture 10, the second secondary vent aperture 10A, the second tertiary vent aperture 10B and/or the second quaternary vent aperture 100 are arranged around the circumference of the second protrusion 32 and are configured to be in fluid communication with the second vent groove 22 of the dome 13, 13A.

Figure 8:
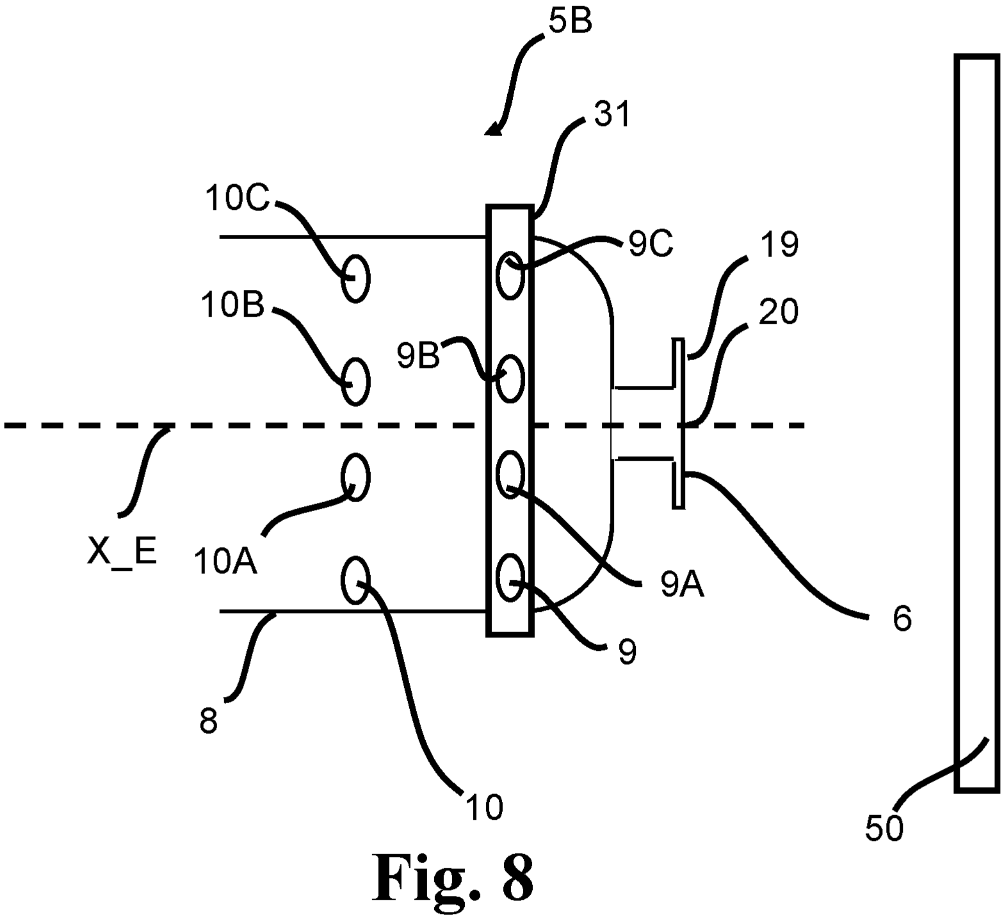
FIG. 8 shows an exemplary earpiece housing of an earpiece.

FIG. 8 shows an exemplary earpiece housing 5B. The exemplary earpiece housing 5B comprises the first protrusion 31 arranged on the outer surface 8 of the earpiece housing 5B. The first protrusion 31 is arranged on a proximal end of the earpiece housing 5B. The first protrusion 31 is configured to be aligned with the first vent groove 21 of the inner surface 14 of the dome 13, 13A along the longitudinal axis, such as along the earpiece axis X_E, when the dome 13, 13A is mounted to the earpiece housing 5B. The first protrusion 31 has a first height. The first height of the first protrusion 31 is less than a first depth of the first vent groove 21 in the dome 13, 13A to ensure fluid communication via the first vent groove 21 in the dome 13, 13A, when the dome 13, 13A is mounted on the earpiece housing 5B. The first protrusion 31 is circumferentially arranged along the outer surface 8 of the earpiece housing 5B. The plurality of first vent apertures, such as the first primary vent aperture 9, the first secondary vent aperture 9A, the first tertiary vent aperture 9B and/or the first quaternary vent aperture 9C, are formed in the first protrusion 31. The plurality of second vent apertures, such as the second primary vent aperture 10, the second secondary vent aperture 10A, the second tertiary vent aperture 10B and/or the second quaternary vent aperture 10C, are formed in the outer surface 8 of the earpiece housing 5B. The second primary vent aperture 10, the second secondary vent aperture 10A, the second tertiary vent aperture 10B and/or the second quaternary vent aperture 100 are arranged on the outer surface 8 of the earpiece housing 5B, such as around the circumference of the outer surface 8 of the earpiece housing 5B. The second primary vent aperture 10, the second secondary vent aperture 10A, the second tertiary vent aperture 10B and/or the second quaternary vent aperture 100 are configured to be aligned with the second vent groove 22 of the inner surface 14 of the dome 13, 13A along the longitudinal axis, such as along the earpiece axis X_E, when the dome 13, 13A is mounted to the earpiece housing 5B. The second primary vent aperture 10, the second secondary vent aperture 10A, the second tertiary vent aperture 10B and/or the second quaternary vent aperture 10C are configured to be in fluid communication with the second vent groove 22 of the dome 13, 13A.

Figure 9:
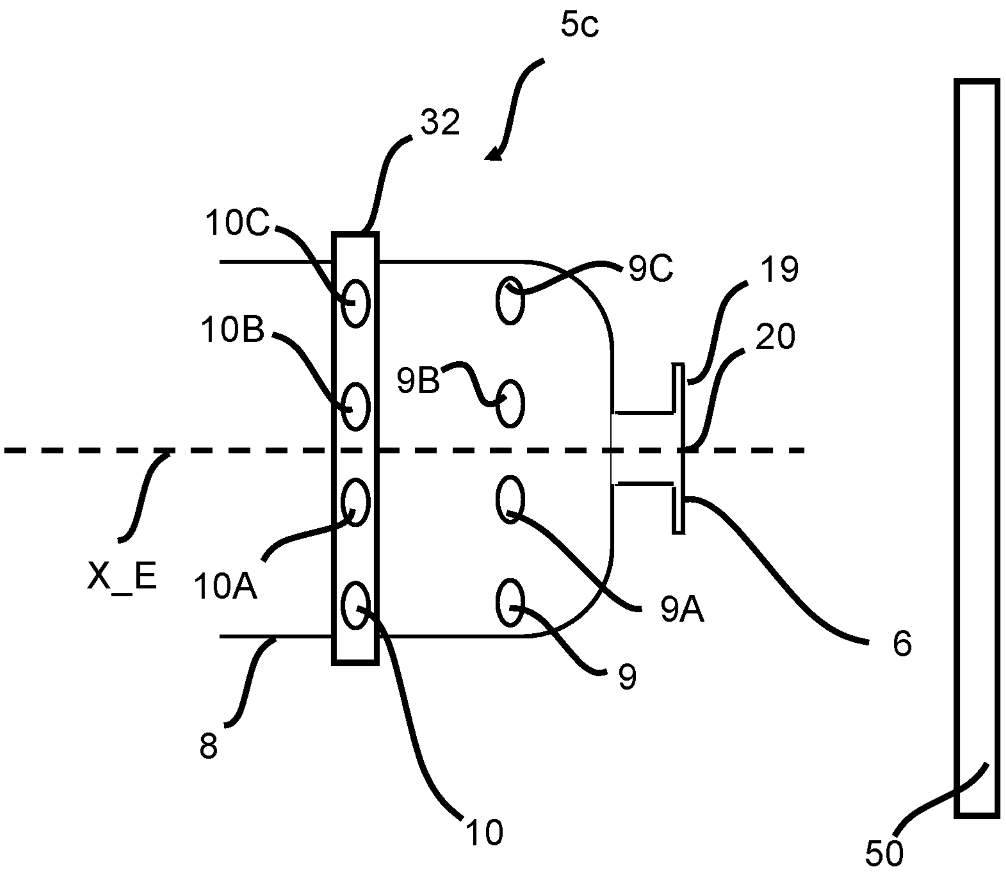
FIG. 9 shows an exemplary earpiece housing of an earpiece.

FIG. 9 shows an exemplary earpiece housing 5C. The exemplary earpiece housing 5C comprises the second protrusion 32 arranged on the outer surface 8 of the earpiece housing 5C. The second protrusion 32 is arranged on a distal end of the earpiece housing 5C. The second protrusion 32 is configured to be aligned with the second vent groove 22 of the inner surface 14 of the dome 13, 13A along the longitudinal axis, such as along the earpiece axis X_E, when the dome 13, 13A is mounted to the earpiece housing 5C. The second protrusion 32 can thus be received by the second vent groove 22 of the dome 13, 13A, when the dome 13, 13A is mounted on the earpiece housing 5C. The second protrusion 32 has a second height. The second height of the second protrusion 32 is less than a second depth of the second vent groove 22 in the dome 13, 13A to ensure fluid communication via the second vent groove 22 in the dome 13, 13A, when the dome 13, 13A is mounted to the earpiece housing 5C. The second protrusion 32 is circumferentially arranged along the outer surface 8 of the earpiece housing 5C. The plurality of second vent apertures, such as the second primary vent aperture 10, the second secondary vent aperture 10A, the second tertiary vent aperture 10B and/or the second quaternary vent aperture 100, are formed in the second protrusion 32. The plurality of second vent apertures, such as the second primary vent aperture 10, the second secondary vent aperture 10A, the second tertiary vent aperture 10B and/or the second quaternary vent aperture 100, are formed in an outer surface of the protrusion 32. The second primary vent aperture 10, the second secondary vent aperture 10A, the second tertiary vent aperture 10B and/or the second quaternary vent aperture 100 are configured to be aligned with the second vent groove 22 of the inner surface 14 of the dome 13, 13A along the longitudinal axis, such as along the earpiece axis X_E, when the dome 13, 13A is mounted to the earpiece housing 5C. The plurality of first vent apertures, such as the first primary vent aperture 9, the first secondary vent aperture 9A, the first tertiary vent aperture 9B and/or the first quaternary vent aperture 9C, are arranged on the outer surface 8 of the earpiece housing 5C. The first primary vent aperture 9, the first secondary vent aperture 9A, the first tertiary vent aperture 9B and/or the first quaternary vent aperture 9C, are configured to be aligned with the second vent groove 22 of the inner surface 14 of the dome 13, 13A along the longitudinal axis, such as along the earpiece axis X_E, when the dome 13, 13A is mounted to the earpiece housing 5C. The first primary vent aperture 9, the first secondary vent aperture 9A, the first tertiary vent aperture 9B, and/or the first quaternary vent aperture 9C are distributed around the circumference of the outer surface 8 of the earpiece housing 5C. The first primary vent aperture 9, the first secondary vent aperture 9A, the first tertiary vent aperture 9B and/or the first quaternary vent aperture 9C are configured to be in fluid communication with the first vent groove 21 of the dome 13, 13A.

Figure 10:
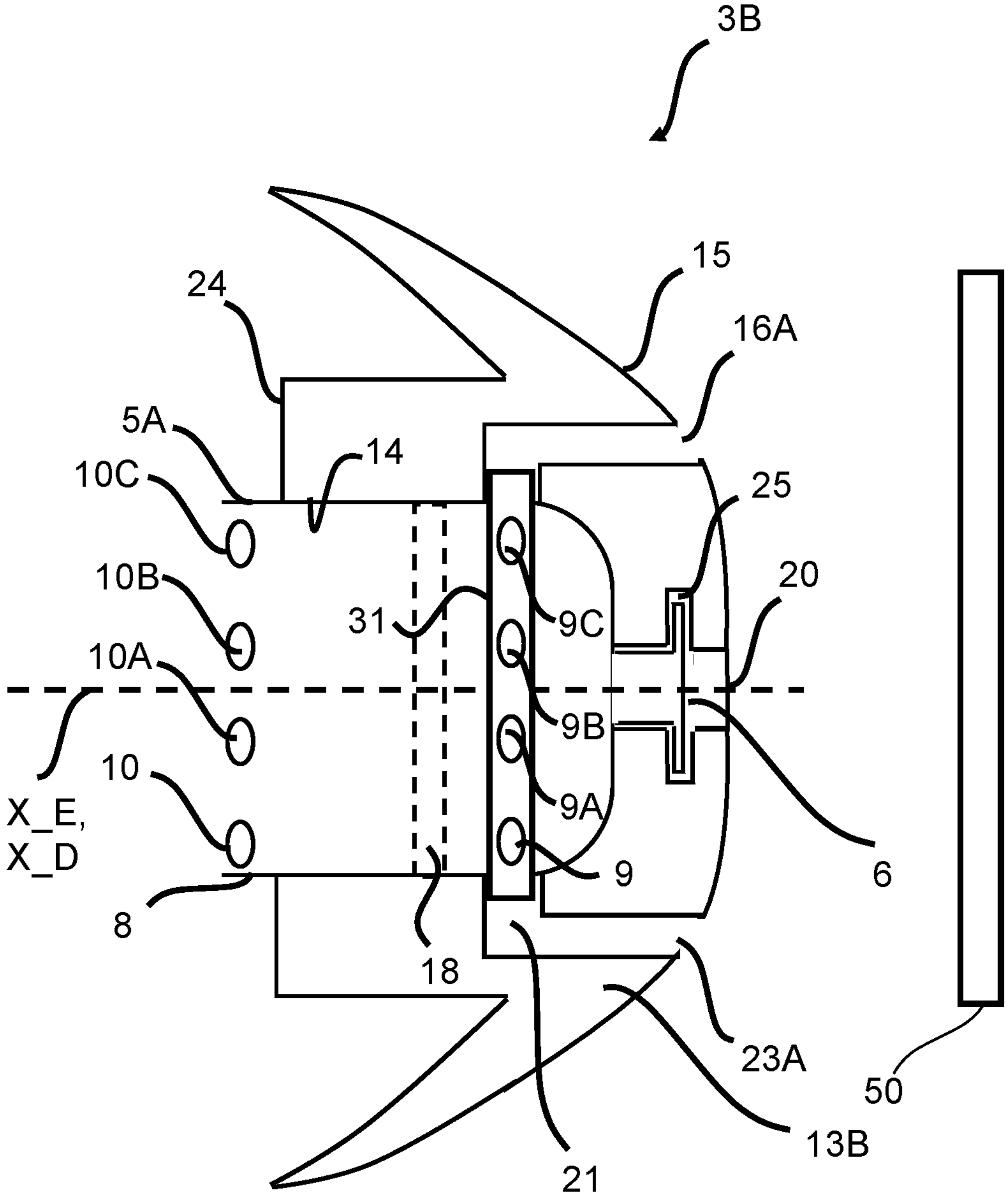
FIG. 10 shows an exemplary earpiece of a hearing device.

FIG. 10 shows a part of an exemplary earpiece 3B. The earpiece 3B comprises an exemplary earpiece housing 5A and an exemplary dome 13B. The outer surface 8 of the earpiece housing 5A comprises a first protrusion 31. The inner surface 14 of the dome 13 comprises a single vent groove, such as the first vent groove 21, being in fluid communication with the first primary vent aperture 16A in the dome 13. As can be seen in FIG. 10 the exemplary dome 13B does, in contrast to the exemplary dome 13A of FIG. 6, not comprise a second vent groove in the distal end of the dome 13B. The first vent groove 21 is further in fluid communication with a first secondary vent aperture 23A. The first primary vent aperture 16A and/or the first secondary vent aperture is a through-going hole and/or a channel in the dome 13B, extending from the proximal surface 15 of the dome 13 to the inner surface 14 of the dome 13B. The first primary vent aperture 16A allows air to flow between the proximal surface 15 of the dome 13B to the inner surface 14 of the dome 13B. The first vent groove 21 is configured to be aligned with the first primary vent aperture 9 in the earpiece housing 5A along the longitudinal axis, such as along the earpiece axis X_E. The first vent groove 21 is circumferentially arranged along the inner surface 14 of the dome 13B. By providing the inner surface 14 of the dome 13B with the first vent groove 21, a fluid connection between the first primary vent aperture 9 in the earpiece housing 5A and the first vent groove 21 of the dome 13B can be ensured when the dome 13B is correctly aligned with the earpiece housing along the earpiece axis X_E, without requiring an alignment of the dome 13B with the earpiece housing in an angular direction. Thereby, an alignment of the dome 13B to the earpiece housing is facilitated. The first vent groove 21 has a first depth. The first vent groove 21 may extend fully or partly along the circumference of the inner surface 14. The first vent groove 21 extends perpendicular to the longitudinal axis, such as the dome axis X_D. The first protrusion 31 of the earpiece housing 5A is aligned with the first vent groove 21 of the inner surface of the dome 13A along the longitudinal axis, such as along the earpiece axis X_E. As can be seen in FIG. 10, the first vent groove 21 of the dome 13A receives the first protrusion 31 and thereby secures the dome 13A to the earpiece housing 5A in the longitudinal direction, such as along the earpiece axis X_E. The first protrusion 31 has a first height. The first height of the first protrusion 31 is less than the first depth of the first vent groove 21 in the dome 13A to ensure fluid communication via the first vent groove 21 in the dome 13A. In other words, by the first height of the first protrusion 31 being less than the first depth of the first vent groove 21 in the dome 13A a cavity is provided between the outer surface of the first protrusion 31 and an inner surface of the first vent groove 21 of the dome 13A through which a fluid can flow. The first protrusion 31 is circumferentially arranged along the outer surface 8 of the earpiece housing 5A. The first protrusion 31 may extend fully or partly along the circumference of the outer surface 8. The first protrusion 31 extends perpendicular to the earpiece axis X_E. By providing the outer surface 8 of the earpiece housing 5A with the first protrusion 31, the dome 13A is further secured to the earpiece housing 5A. The first protrusion 31 may comprise a plurality of first protrusion parts arranged along the circumference of the outer surface in the first position. In the example earpiece housing 5A shown in FIG. 10, the first vent aperture(s) 9 of the earpiece housing 5A is formed in the first protrusion 31. The example earpiece housing 5A comprises a second vent aperture 10 arranged distal to the first vent apertures 9. In the example earpiece housing 5A shown in FIG. 10, the second vent apertures 10 are arranged distal to the distal surface 24 of the dome 13B, when the dome 13B is arranged on the earpiece housing 5A. in the exemplary earpiece 3B shown in FIG. 10, the distal surface 24 of the dome 13B is thus arranged proximal to the second vent aperture 10 of the earpiece hosing 5A along the earpiece axis X_E. The second vent apertures 10 are thus in fluid communication with an outer ear canal, such that air can flow between the earpiece housing 5A and the outer ear canal, through the second vent apertures 10 without passing through the dome 13B.

Examples of earpieces for hearing devices, earpiece parts and domes according to the disclosure are set out in the following items:

Item 1. An earpiece for a hearing device for insertion into an ear canal of a user and having a longitudinal axis, the earpiece comprising:

a. an earpiece part comprising an earpiece housing having a distal end, a proximal end, and an outer surface connecting the distal end to the proximal end, the earpiece housing comprising a first primary vent aperture and a second primary vent aperture in the outer surface, the earpiece part comprising a receiver arranged within the earpiece housing; and b. a dome for securing the earpiece in the ear canal, wherein the dome has an inner surface extending circumferentially along the outer surface of the earpiece housing, the dome comprising a proximal surface having a first primary vent aperture, wherein the earpiece comprises a vent path forming a fluid communication between the first primary vent aperture of the dome and the second primary vent aperture of the earpiece housing via the first primary vent aperture of the earpiece housing.

Item 2. Earpiece according to Item 1, wherein the inner surface of the dome comprises a first vent groove being in fluid communication with the first primary vent aperture in the dome, and wherein the first vent groove is aligned with the first primary vent aperture in the earpiece housing along the longitudinal axis.

Item 3. Earpiece according to Item 2, wherein the proximal surface of the dome has a first secondary vent aperture in fluid communication with the first vent groove.

Item 4. Earpiece according to any one of Items 1-3, wherein the dome comprises a distal surface having a second primary vent aperture in a distal surface, wherein the second primary vent aperture in the dome is arranged to be in fluid communication with the second primary vent aperture in the earpiece housing.

Item 5. Earpiece according to Item 4, wherein the inner surface of the dome comprises a second vent groove being in fluid communication with the second primary vent aperture of the dome, and wherein the second vent groove is aligned with the second primary vent aperture in the earpiece housing along the longitudinal axis.

Item 6. Earpiece according to Item 5, wherein the distal surface of the dome has a second secondary vent aperture in fluid communication with the second vent groove.

Item 7. Earpiece according to any one of Items 1-6, wherein the first primary vent aperture of the earpiece housing is proximal to the second primary vent aperture of the earpiece housing.

Item 8. Earpiece according to any one of Items 1-7, wherein the earpiece part comprises a vent mechanism arranged in the earpiece housing, and wherein the vent mechanism is arranged between the first primary vent aperture and the second primary vent aperture of the earpiece housing and configured to open and close the vent path.

Item 9. Earpiece according to any one of Items 1-8, wherein the earpiece housing comprises a flange arranged at the proximal end of the earpiece housing for securely attaching the dome to the earpiece housing.

Item 10. An earpiece part for an earpiece of a hearing device, the earpiece part comprising an earpiece housing having a distal end, a proximal end, and an outer surface connecting the distal end to the proximal end, the earpiece housing comprising a first primary vent aperture and a second primary vent aperture in the outer surface, wherein the first primary vent aperture of the earpiece housing is proximal to the second primary vent aperture of the earpiece housing.

Item 11. Earpiece part according to Item 10, wherein the earpiece part comprises a vent mechanism arranged between the first primary vent aperture and the second primary vent aperture of the earpiece housing and configured to open and close a vent path between the first primary vent aperture and the second primary vent aperture.

Item 12. A dome for an earpiece of a hearing device, the dome configured for securing the earpiece in an ear canal, wherein the dome has an inner surface forming a cavity and configured for extending circumferentially along an outer surface of an earpiece housing, the dome comprising a proximal surface having a first primary vent aperture, wherein the first primary vent aperture is in fluid communication with the cavity.

The use of the terms “first”, “second”, “third” and “fourth”, “primary”, “secondary”, “tertiary” etc. does not imply any particular order, but are included to identify individual elements. Moreover, the use of the terms “first”, “second”, “third” and “fourth”, “primary”, “secondary”, “tertiary” etc. does not denote any order or importance, but rather the terms “first”, “second”, “third” and “fourth”, “primary”, “secondary”, “tertiary” etc. are used to distinguish one element from another. Note that the words “first”, “second”, “third” and “fourth”, “primary”, “secondary”, “tertiary” etc. are used here and elsewhere for labelling purposes only and are not intended to denote any specific spatial or temporal ordering.

Furthermore, the labelling of a first element does not imply the presence of a second element and vice versa.

It may be appreciated that FIGS. 1-9 comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly, to be regarded in an illustrative rather than restrictive sense. The claimed invention is intended to cover all alternatives, modifications, and equivalents.

LIST OF REFERENCES

2 hearing device
3, 3A, 3B earpiece
4, 4A earpiece part
5, 5A, 5B, 5C earpiece housing
6 proximal end of earpiece housing
7 distal end of earpiece housing
8 outer surface of earpiece housing
9 first primary vent aperture of earpiece housing
9A first secondary vent aperture of earpiece housing
9B first tertiary vent aperture of earpiece housing
9C first quaternary vent aperture of earpiece housing
10 second primary vent aperture of earpiece housing
10A second secondary vent aperture of earpiece housing
10B second tertiary vent aperture of earpiece housing
10C second quaternary vent aperture of earpiece housing
11 receiver
12 nozzle element
13, 13A dome
14 inner surface of dome
14A cavity
15 proximal surface of dome
16 primary vent aperture
16A first primary vent aperture of dome
16B second primary vent aperture of dome
17 vent path
18 vent mechanism
19 flange
20 sound outlet
21 first vent groove
22 second vent groove
23 secondary vent aperture
23A first secondary vent aperture of dome
23B second secondary vent aperture of dome
24 distal surface of dome
25 groove in inner surface of dome, flange groove
31 first protrusion on outer surface of earpiece housing
32 second protrusion on outer surface of earpiece housing
50 ear drum
X_E earpiece axis
X_D dome axis

The invention claimed is:

1. An earpiece for a hearing device for insertion into an ear canal of a user, the earpiece comprising:

an earpiece part comprising an earpiece housing having a distal end, a proximal end, and an outer surface extending between the distal end and the proximal end, the earpiece housing comprising a first aperture and a second aperture at the outer surface, the earpiece part also comprising a receiver in the earpiece housing;

a dome for coupling with the earpiece housing of the earpiece part, wherein the dome has an inner surface extending circumferentially along the outer surface of the earpiece housing, the dome comprising a first exterior surface having a first primary aperture; and a vent path in the earpiece, the vent path extending between the first primary aperture of the dome and the first aperture of the earpiece housing, and extending between the first aperture of the earpiece housing and the second aperture of the earpiece housing;

wherein the dome is configured to be inserted into the ear canal such that a peak of the dome faces towards an eardrum of the user.

2. The earpiece according to claim 1, wherein the inner surface of the dome comprises a first groove being in fluid communication with the first primary aperture of the dome, and wherein the first groove is aligned with the first aperture of the earpiece housing.

3. The earpiece according to claim 2, wherein the earpiece has a longitudinal axis, and wherein the first groove is aligned with the first aperture of the earpiece housing along the longitudinal axis.

4. The earpiece according to claim 2, wherein the first exterior surface of the dome has a first secondary aperture in fluid communication with the first groove.

5. The earpiece according to claim 1, wherein the first aperture of the earpiece housing is proximal to the second aperture of the earpiece housing.

6. The earpiece according to claim 1, wherein the earpiece part comprises a vent mechanism in the earpiece housing, and wherein the vent mechanism is between the first aperture and the second aperture of the earpiece housing, and wherein the vent mechanism is configured to open and close a vent path.

7. The earpiece according to claim 1, wherein the earpiece housing comprises a flange at the proximal end of the earpiece housing for attachment with the dome.

8. The earpiece according to claim 1, wherein the dome is configured to detachably couple with the earpiece housing of the earpiece part.

9. The earpiece according to claim 1, wherein the dome has an inner opening at the inner surface of the doom, wherein the inner opening of the dome is over the first aperture of the earpiece housing when the dome is coupled with the earpiece housing, and wherein a part of the vent path extends from the first primary aperture of the doom to the inner opening of the dome.

10. The earpiece according to claim 1, wherein the dome comprises a sound outlet that is different from the first primary aperture.

11. An earpiece for a hearing device for insertion into an ear canal of a user, the earpiece comprising:

an earpiece part comprising an earpiece housing having a distal end, a proximal end, and an outer surface extending between the distal end and the proximal end, the earpiece housing comprising a first aperture and a second aperture at the outer surface, the earpiece part also comprising a receiver in the earpiece housing;

a dome for coupling with the earpiece housing of the earpiece part, wherein the dome has an inner surface extending circumferentially along the outer surface of the earpiece housing, the dome comprising a first exterior surface having a first primary aperture; and a vent path forming a fluid communication between the first primary aperture of the dome and the second aperture of the earpiece housing via the first aperture of the earpiece housing;

wherein the dome is configured to be inserted into the ear canal such that a peak of the dome faces towards an eardrum of the user; and wherein the dome comprises a second exterior surface having a second primary aperture, the second exterior surface being distal to the first exterior surface, wherein the second primary aperture of the dome is in fluid communication with the second aperture of the earpiece housing.

12. The earpiece according to claim 11, wherein the inner surface of the dome comprises a first groove being in fluid communication with the first primary aperture of the dome, wherein the inner surface of the dome comprises a second groove being in fluid communication with the second primary aperture of the dome, and wherein the second groove is aligned with the second aperture of the earpiece housing.

13. The earpiece according to claim 12, wherein the second exterior surface of the dome has a second secondary aperture in fluid communication with the second groove.

14. An earpiece part for an earpiece of a hearing device, the earpiece part comprising an earpiece housing having a distal end, a proximal end, and an outer surface extending between the distal end and the proximal end, the earpiece housing comprising a first aperture and a second aperture at the outer surface, wherein the first aperture of the earpiece housing is proximal to the second aperture of the earpiece housing, wherein the proximal end of the earpiece housing is configured to couple with a dome, wherein when the proximal end of the earpiece housing is coupled with the dome, at least a part of the dome is over the first aperture of the earpiece housing, and wherein the proximal end of the earpiece housing is configured to be inserted deeper into an ear canal of a user than the distal end of the earpiece housing.

15. The earpiece part according to claim 14, further comprising a vent mechanism arranged between the first aperture and the second aperture of the earpiece housing, the vent mechanism being configured to open and close a vent path between the first aperture and the second aperture.

16. The earpiece part according to claim 15, wherein the vent mechanism is in the earpiece housing.

17. The earpiece part according to claim 14, wherein the earpiece housing comprises a flange at the proximal end of the earpiece housing for attachment with a dome.

18. The earpiece part according to claim 14, further comprising the dome.

19. A dome for an earpiece, the dome configured for coupling with the earpiece, wherein the dome has an inner surface forming a cavity and configured to extend circumferentially along an outer surface of an earpiece housing of the earpiece when the dome is coupled with the earpiece housing of the earpiece, the dome comprising a first exterior surface having a first primary aperture, wherein the first primary aperture is in fluid communication with the cavity, wherein the dome further comprises a sound outlet that is different from the first primary aperture, and wherein the dome is configured to be inserted into an ear canal of a user such that a peak of the dome faces towards an eardrum of the user.

20. The dome according to claim 19, wherein the inner surface of the dome comprises a first groove being in fluid communication with the first primary aperture of the dome.

21. The dome according to claim 20, wherein the first groove is aligned with a first aperture of the earpiece housing.

22. The dome according to claim 20, wherein the first exterior surface of the dome has a first secondary aperture in fluid communication with the first groove.

23. The dome according to claim 19, wherein the dome has an inner opening at the inner surface of the doom, and wherein the dome comprises a vent path extending from the first primary aperture of the doom to the inner opening of the dome.

24. A dome for an earpiece, the dome configured for coupling with the earpiece, wherein the dome has an inner surface forming a cavity and configured to extend circumferentially along an outer surface of an earpiece housing of the earpiece when the dome is coupled with the earpiece housing of the earpiece, the dome comprising a first exterior surface having a first primary aperture, wherein the first primary aperture is in fluid communication with the cavity, wherein the dome further comprises a sound outlet that is different from the first primary aperture, and wherein the dome is configured to be inserted into an ear canal of a user such that a peak of the dome faces towards an eardrum of the user;

wherein the dome comprises a second exterior surface having a second primary aperture, the second exterior surface being distal to the first exterior surface, wherein the second primary aperture of the dome is in fluid communication with an aperture of the earpiece housing.

25. The dome according to claim 24, wherein the inner surface of the dome comprises a first groove being in fluid communication with the first primary aperture of the dome, and wherein the inner surface of the dome comprises a second groove being in fluid communication with the second primary aperture of the dome.

26. An earpiece for a hearing device for insertion into an ear canal of a user, the earpiece comprising:

an earpiece part comprising an earpiece housing having a distal end, a proximal end, and an outer surface extending between the distal end and the proximal end, the earpiece housing comprising a first aperture and a second aperture at the outer surface, the earpiece part also comprising a receiver in the earpiece housing;

a dome for coupling with the earpiece housing of the earpiece part, wherein the dome has an inner surface extending circumferentially along the outer surface of the earpiece housing, the dome comprising a first exterior surface having a first primary aperture; and a vent path forming a fluid communication between the first primary aperture of the dome and the second aperture of the earpiece housing via the first aperture of the earpiece housing;

wherein the proximal end of the earpiece housing is configured to output sound, wherein the dome is configured to couple to the proximal end of the earpiece housing, wherein when the proximal end of the earpiece housing is coupled with the dome, at least a part of the dome is over the first aperture of the earpiece housing, and wherein the proximal end of the earpiece housing is configured to be inserted deeper into the ear canal of the user than the distal end of the earpiece housing.

27. An earpiece for a hearing device for insertion into an ear canal of a user, the earpiece comprising:

an earpiece part comprising an earpiece housing having a distal end, a proximal end, and an outer surface extending between the distal end and the proximal end, the earpiece housing comprising a first aperture and a second aperture at the outer surface, the earpiece part also comprising a receiver in the earpiece housing;

a dome for coupling with the earpiece housing of the earpiece part, wherein the dome has an inner surface extending circumferentially along the outer surface of the earpiece housing, the dome comprising a first exterior surface having a first primary aperture; and a vent path in the earpiece, the vent path extending between the first primary aperture of the dome and the first aperture of the earpiece housing, and extending between the first aperture of the earpiece housing and the second aperture of the earpiece housing;

wherein the earpiece housing comprises a sound outlet, and wherein the dome is configured to couple with the sound outlet of the earpiece housing.

28. The earpiece according to claim 27, wherein the dome has an inner opening at the inner surface of the doom, wherein the inner opening of the dome is over the first aperture of the earpiece housing when the dome is coupled with the earpiece housing, and wherein a part of the vent path extends from the first primary aperture of the dome to the inner opening of the dome.

29. The earpiece according to claim 27, wherein the dome comprises a sound outlet that is different from the first primary aperture.

* * * * *